US012717005B2

(12) United States Patent
Shi

(10) Patent No.: US 12,717,005 B2
(45) Date of Patent: Aug. 25, 2026

(54) ABNORMAL FIELD OF VIEW RECOGNITION METHOD AND DEVICE, STORAGE MEDIUM AND MEMS LIDAR

(71) Applicant: SUTENG INNOVATION TECHNOLOGY CO., LTD., Shenzhen (CN)

(72) Inventor: Zhaohui Shi, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 975 days.

(21) Appl. No.: 17/962,510

(22) Filed: Oct. 9, 2022

(65) Prior Publication Data

US 2023/0112106 A1 Apr. 13, 2023

(30) Foreign Application Priority Data

Oct. 9, 2021 (CN) .......................... 202111176627.9

(51) Int. Cl.
*G01S 7/481* (2006.01)
*G01S 7/497* (2006.01)
*G01S 17/89* (2020.01)

(52) U.S. Cl.
CPC .......... *G01S 7/4817* (2013.01); *G01S 7/4972* (2013.01); *G01S 17/89* (2013.01)

(58) Field of Classification Search
None
See application file for complete search history.

(56) References Cited

U.S. PATENT DOCUMENTS

2018/0275249 A1 9/2018 Campbell et al.
2022/0268896 A1* 8/2022 Ueno ...................... G01S 7/497
2023/0056655 A1* 2/2023 Talai ..................... G01S 7/4034

FOREIGN PATENT DOCUMENTS

WO 2020135802 A1 7/2020

OTHER PUBLICATIONS

First Office Action issued in related Chinese Application No. 202111176627.9, mailed Jul. 2, 2024, 7 pages.
European Search Report issued in related European Application No. EP22200519.1, mailed Feb. 7, 2023, 8 pages.

* cited by examiner

*Primary Examiner* — Isam A Alsomiri
*Assistant Examiner* — Joseph C Fritchman
(74) *Attorney, Agent, or Firm* — BAYES PLLC

(57) ABSTRACT

The present application discloses an abnormal field of view recognition method and device, a storage medium, and a MEMS LiDAR. The method includes respectively adjusting angles of a galvanometer in an X axis and a Y axis when the MEMS LiDAR is started; acquiring echo data from scanning a window at the adjusted angles of the galvanometer in the X axis and the Y axis; acquiring distances, from the echo data, between an upper edge, a lower edge, a left edge, and a right edge of the window and the MEMS LiDAR; and determining whether a field of view of the galvanometer is abnormal or not based on the distances between the upper edge, the lower edge, the left edge, and the right edge of the window and the MEMS LiDAR.

6 Claims, 18 Drawing Sheets

ABNORMAL FIELD OF VIEW RECOGNITION METHOD AND DEVICE, STORAGE MEDIUM AND MEMS LIDAR

CROSS-REFERENCE TO RELATED APPLICATION

The present application claims the benefit of priority to China Patent Application No. CN202111176627.9, filed on Oct. 9, 2021, the content of which is incorporated herein by reference in its entirety.

TECHNICAL FIELD

The present application relates to the field of computers, and in particular to an abnormal field of view recognition method and device, a storage medium, and a MEMS LiDAR.

BACKGROUND

A Micro-Electro-Mechanical System (MEMS) LiDAR is suitable for large-scale application due to its small size and low cost. The MEMS LiDAR is provided with a galvanometer, and a detection range of the MEMS LiDAR is closely related to a field of view (FOV) of the galvanometer. The FOV of the galvanometer may be larger or smaller due to the attenuation of device performance or the harsh use environment of the MEMS, thereby affecting the detection range of the LiDAR.

SUMMARY

The embodiments of the present application provide an abnormal field of view recognition method and device, a storage medium, and a MEMS LiDAR. Whether the field of view of the galvanometer is abnormal or not is detected during the start and operation of the MEMS LiDAR, so that the safety problem caused by the abnormal field of view of the galvanometer is avoided, and the safety and reliability of the MEMS LiDAR are improved. The technical solutions are as follows:

In a first aspect, an embodiment of the present application provides an abnormal field of view recognition method, which includes:

respectively adjusting angles of the galvanometer in an X axis and a Y axis when the MEMS LiDAR is started;

acquiring echo data from scanning a window at the adjusted angles of the galvanometer in the X axis and the Y axis;

acquiring distances, from the echo data, between an upper edge, a lower edge, a left edge, and a right edge of the window and the MEMS LiDAR; and determining whether a field of view of the galvanometer is abnormal or not based on the distances between the upper edge, the lower edge, the left edge, and the right edge of the window and the MEMS LiDAR.

In a second aspect, an embodiment of the present application provides an abnormal field of view recognition method, which includes:

acquiring a feedback signal from a feedback circuit of the galvanometer at a current moment when the MEMS LiDAR is operating;

acquiring amplitudes of the feedback signal in the direction of an X axis and a Y axis, the amplitudes of the feedback signal in the directions of the X axis and the Y axis being angles of the galvanometer at the current moment in the X axis and the Y axis; and determining whether a field of view of the galvanometer at the current moment is abnormal or not based on the amplitudes of the feedback signal in the directions of the X axis and the Y axis.

In a third aspect, an embodiment of the present application provides an abnormal field of view recognition device, which includes:

an angle adjustment module, configured to respectively adjust angles of the galvanometer in an X axis and a Y axis when the MEMS LiDAR is started;

a data acquisition module, configured to acquire echo data from scanning a window at the adjusted angles of the galvanometer in the X axis and the Y axis;

a distance acquisition module, configured to acquire distances, from the echo data, between an upper edge, a lower edge, a left edge, and a right edge of the window and the MEMS LiDAR; and a field of view determination module, configured to determine whether a field of view of the galvanometer is abnormal or not based on the distances between the upper edge, the lower edge, the left edge, and the right edge of the window and the MEMS LiDAR.

In a fourth aspect, an embodiment of the present application provides an abnormal field of view recognition device, which includes:

a signal acquisition module, configured to acquire a feedback signal from a feedback circuit of the galvanometer at a current moment when the MEMS LiDAR is operating;

an amplitude acquisition module, configured to acquire amplitudes of the feedback signal in the direction of an X axis and a Y axis, the amplitudes of the feedback signal in the direction of the X axis and the Y axis being angles of the galvanometer at the current moment in the X axis and the Y axis; and a field of view determination module, configured to determine whether a field of view of the galvanometer at the current moment is abnormal or not based on the amplitudes of the feedback signal in the direction of the X axis and the Y axis.

In a fifth aspect, an embodiment of the present application provides a computer storage medium having a plurality of instructions stored thereon, wherein the instructions, when loaded and executed by a processor, are adapted to implement the method steps described above.

In a sixth aspect, an embodiment of the present application provides a MEMS LiDAR, which may include a processor and a memory, wherein the memory has a computer program stored thereon, and the computer program, when loaded and executed by the processor, is adapted to implement the method steps described above.

The beneficial effects brought by the technical solutions provided in the embodiments of the present application at least include the following.

According to the technical solutions provided in the embodiments of the present application, the field of view of the galvanometer can be detected when the MEMS LiDAR is started, and the starting of the MEMS LiDAR is interrupted when the field of view of the galvanometer is detected to be abnormal, and meanwhile, the fault code is output to the master computer, so that the safety problem caused by the abnormal field of view of the galvanometer is avoided, and the reliability and safety of the MEMS LiDAR are improved. In addition, during the operation of the MEMS LiDAR, whether the field of view of the galvanometer at the current moment is abnormal or not can be determined based on the amplitudes of the feedback signal from the galvanometer at the current moment in the directions of the X axis and the Y axis, wherein if the field of view of the galvanometer at the current moment is normal, the MEMS LiDAR is kept to operate normally, and if the field of view of the galvanometer at the current moment is abnormal, the fault code is output to the master computer to prompt a user to deal with this case accordingly, so that whether the field of view of the galvanometer is abnormal or not during the operation of the MEMS LiDAR can be determined in real time, thereby avoiding the safety problem caused by the abnormal field of view of the galvanometer, and improving the safety and reliability of the MEMS LiDAR.

BRIEF DESCRIPTION OF DRAWINGS

In order to more clearly illustrate embodiments of the present application or the technical solutions in the related art, the drawings required for use in the embodiments will be briefly described below. It is obvious that the drawings in the description below are only some embodiments of the present application, and other drawings can be derived from these drawings by those of ordinary skill in the art without making creative efforts.

DETAILED DESCRIPTION

In order to make the purposes, technical solutions, and advantages of the present application clearer, the embodiments of the present application will be further described in detail with reference to the accompanying drawings.

When accompanying drawings are involved in the description below, the same numbers in different drawings represent the same or similar elements, unless otherwise indicated. The implementations described in the following exemplary embodiments do not represent all implementations consistent with the present application. Rather, they are merely examples of devices and methods consistent with certain aspects of the present application detailed in the appended claims.

In the description of the present application, it shall be understood that the terms "first," "second," and the like are used for descriptive purposes only and are not to be construed as indicating or implying relative importance. The specific meanings of the above terms in the present application can be understood according to specific situations by those of ordinary skill in the art. In addition, in the description of the present application, "a plurality of" refers to two or more unless otherwise specified. The term "and/or" describes an associative relationship describing associated objects, and means that there may be three relationships, for example, A and/or B may represent that: A is present alone, A and B are present simultaneously, and B is present alone. The character "/" generally indicates an "or" relationship between the associated objects.

The present application will be described in detail with reference to specific embodiments.

The method may be implemented by means of a computer program and may be executed on an abnormal field of view recognition device based on a Von Neumann system. The computer program may be integrated into the application or may run as a separate tool-like application. The abnormal field of view recognition device according to the embodiment of the present application may be a MEMS LiDAR.

Figure 1:
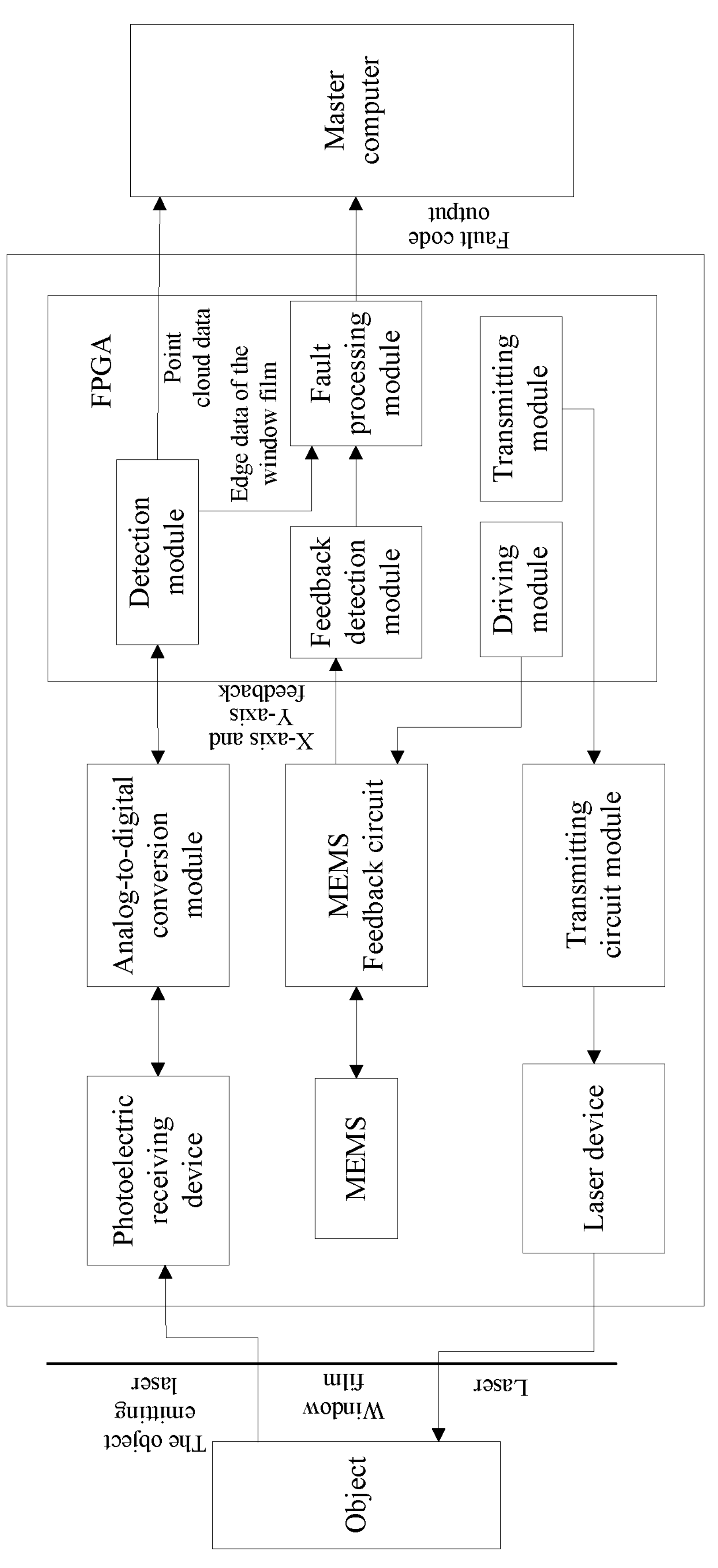
FIG. 1 is a schematic system architecture of an abnormal field of view recognition method according to an embodiment of the present application.

Referring to FIG. 1, a schematic system architecture of an abnormal field of view recognition method is provided according to an embodiment of the present application. The FIGURE includes an object, a window, a MEMS, a field programmable gate array (FPGA), a laser device, a photoelectric receiving device, an analog-to-digital conversion module, a MEMS feedback circuit, a transmitting circuit module, and a master computer, wherein the FPGA includes a detection module, a feedback detection module, a driving module, a transmitting module, and a fault processing module.

When the MEMS LiDAR is started, the driving module controls the galvanometer of the MEMS to adjust the angle, the transmitting module issues an instruction to the transmitting circuit module, and then the laser device is driven to transmit laser to pass through the window to scan the object. The photoelectric receiving device receives the laser reflected by the object and feeds the laser back to the FPGA through the analog-to-digital conversion module, and the FPGA recognizes whether edge data of the window exist or not through the detection module; if yes, point cloud data are transmitted to the master computer, the angle of the galvanometer is adjusted to the angle before the MEMS LiDAR is started, and the MEMS LiDAR is started to operate; and if not, the fault processing module is informed to perform fault processing, and a fault code is output to the master computer.

When the MEMS LiDAR operates, the driving module transmits driving information to the MEMS feedback circuit, and the MEMS feedback circuit drives the MEMS to control the galvanometer. The MEMS feeds the feedback information at the current moment back to the MEMS feedback circuit, and the MEMS feedback circuit transmits the feedback information of the X axis and the Y axis to the feedback detection module for determination. If the scanning of the galvanometer at the current moment in the X axis and the Y axis is determined to be normal, the MEMS LiDAR is kept to operate normally; and if the field of view of the galvanometer of the MEMS at the current moment is determined to be abnormal, the fault processing module is informed to perform fault processing, and a fault code is output to the master computer.

Figure 2:
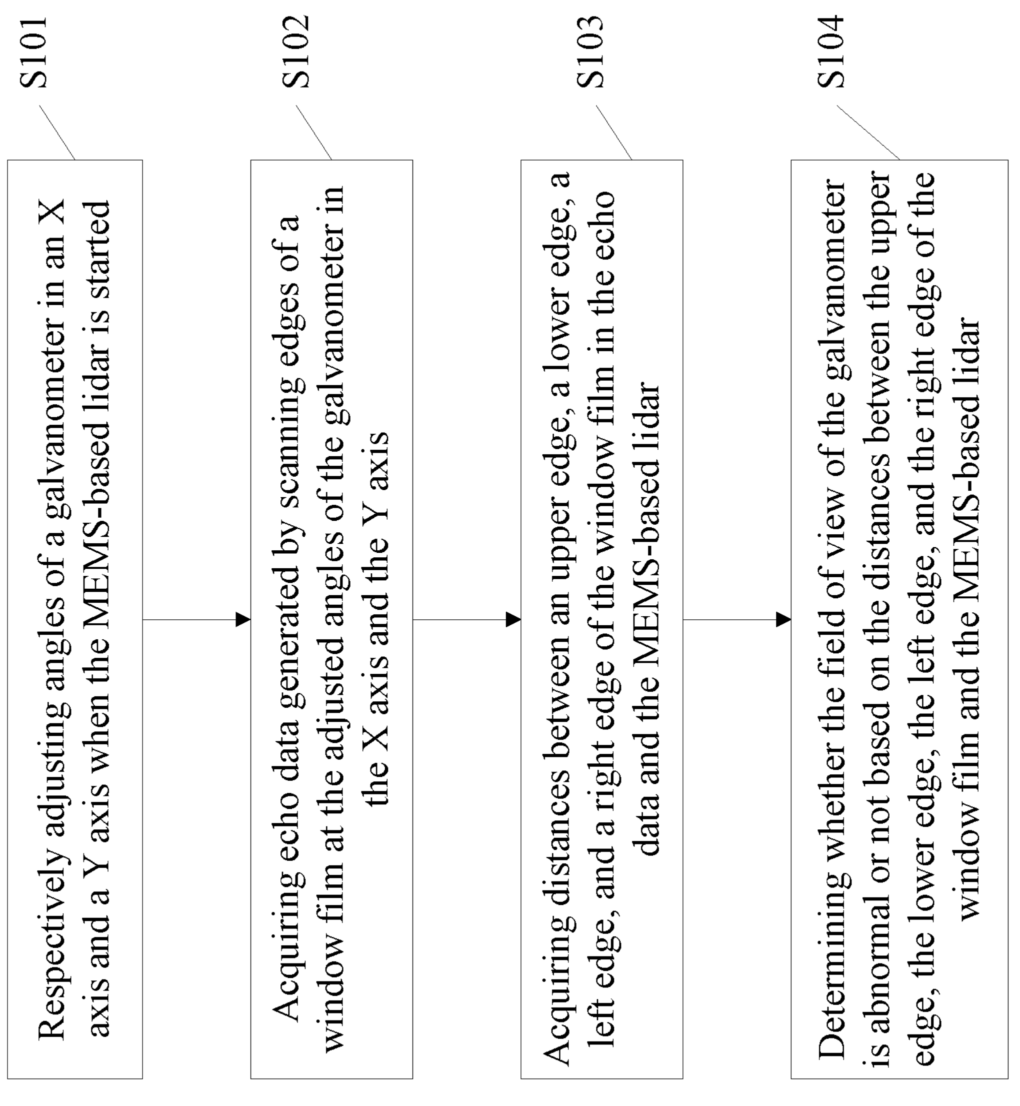
FIG. 2 is a schematic flowchart of an abnormal field of view recognition method according to an embodiment of the present application.

Referring to FIG. 2, a schematic flowchart of an abnormal field of view recognition method is provided according to an embodiment of the present application.

The embodiment of the present application is described by taking a MEMS LiDAR as an example, and the abnormal field of view recognition method may include the following steps.

In S101, angles of the galvanometer in an X axis and a Y axis are adjusted respectively when the MEMS LiDAR is started.

The galvanometer may be a part in a MEMS LiDAR and is used for adjusting the angle under the control of driving, so that the scanning laser irradiates the object to be scanned by changing its track, and the galvanometer is mainly adjusted in the X-axis direction and the Y-axis direction.

The angle of the galvanometer in the X axis may be a reflection angle of the galvanometer in the X-axis direction when the galvanometer reflects the laser.

The angle of the galvanometer in the Y axis may be a reflection angle of the galvanometer in the Y-axis direction when the galvanometer reflects the laser.

When the MEMS LiDAR is started, in order to recognize and confirm the field of view condition of the galvanometer of the MEMS LiDAR, the adjustment of the angle of the galvanometer is a preparation for subsequent recognition. The angle of adjustment may be a moderately-increased angle of the galvanometer in the X axis and the Y axis so as to provide convenience for the implementation of the subsequent recognition procedure.

It should be noted that, when the galvanometer operates normally, the edges of the window cannot be scanned, and in order to determine whether the field of view of the galvanometer is abnormal or not by detecting the edges of the window, the angles of the galvanometer in the X axis and the Y axis need to be increased moderately.

In S102, echo data from scanning a window at the adjusted angles of the galvanometer in the X axis and the Y axis are acquired.

The echo data may be an echo signal reflected from an edge of the window, which is formed by an attenuation delay signal caused by a change of a laser transmission medium after the laser passes through the galvanometer and detects the edge of the window. If the echo data can be acquired, it can be considered that the transmission medium is changed when the laser irradiates the window, that is, the edge of the window is scanned.

The echo data respectively corresponding to the upper edge, the lower edge, the left edge, and the right edge are obtained by respectively scanning the upper edge and the lower edge of the window at the adjusted angle of the galvanometer in the Y axis and by respectively scanning the left edge and the right edge of the window at the adjusted angle of the galvanometer in the X axis. The echo data are point cloud data, which include information of an object or information between objects, such as distance information, height, speed, attitude, and even shape parameters. In an implementation, one frame of echo data of the LiDAR includes 125×126 points, which are 125 columns and 126 lines, and the distance information of each point in the echo data may be obtained by acquiring the distance information of 125×126 points after acquiring the echo data of 125×126 points.

Figure 3:
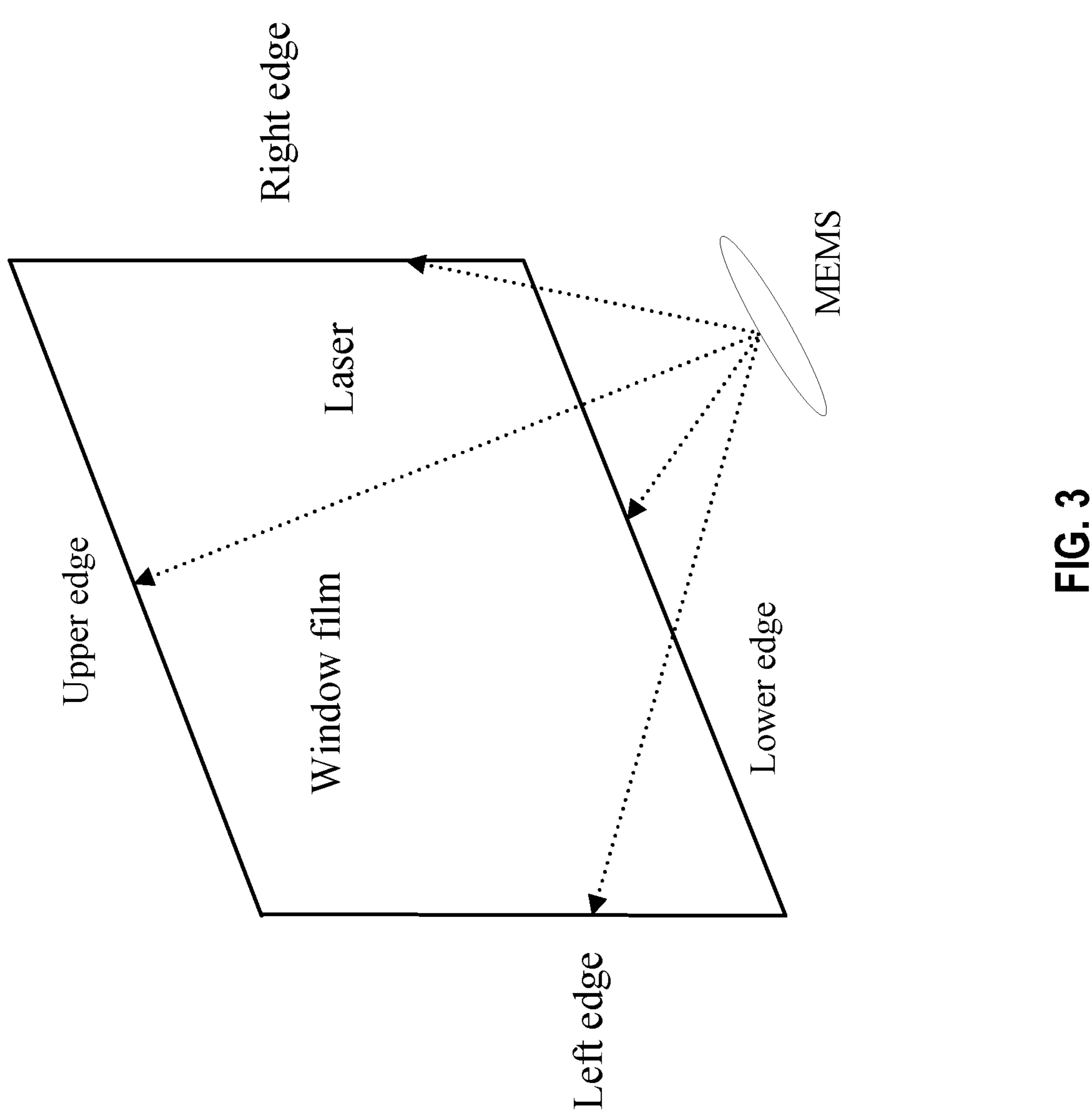
FIG. 3 is an exemplary schematic diagram of an effect of adjusting an angle of a galvanometer according to an embodiment of the present application.

As shown in FIG. 3, when the laser passes through the galvanometer and scans the edges of the window, the laser may generate an echo signal because the medium of the edges of the window is different from the medium of the window, thereby acquiring the echo data.

The window may be a thin film made of a light-permeable material, the periphery of the window is provided with light-impermeable materials as the edges of the window, and the window is smooth and flat in order not to affect the determination of the field of view.

In S103, distances between an upper edge, a lower edge, a left edge, and a right edge of the window in the echo data and the MEMS LiDAR are acquired.

After the echo data of the edges of the window obtained by scanning are acquired, the distances between the upper edge, the lower edge, the left edge, and the right edge of the window in the echo data and the MEMS LiDAR are acquired respectively.

In S104, whether a field of view of the galvanometer is abnormal or not is determined based on the distances between the upper edge, the lower edge, the left edge, and the right edge of the window and the MEMS LiDAR.

Based on the distances between the upper edge, the lower edge, the left edge, and the right edge of the window and the MEMS LiDAR, which are obtained in S103, the distances between the upper edge, the lower edge, the left edge, and the right edge of the window and the MEMS LiDAR are respectively compared with a preset distance range. If the distances obtained in the detection period are all within the preset distance range, it can be considered that the field of view of the galvanometer is normal, and the galvanometer can work normally. If at least one of the distances obtained in the detection period is not within the preset distance range, it can be considered that the field of view of the galvanometer is abnormal, and the galvanometer cannot work normally; the MEMS LiDAR is thus not started, and the galvanometer needs to be checked and maintained.

The preset distance range may be a target theoretical distance obtained through multiple tests. For example, the target theoretical distance is within a theoretical threshold range, and if the obtained distance is not within the theoretical threshold range, it can be considered that the field of view of the galvanometer is abnormal, and the galvanometer cannot work normally.

In the embodiment of the present application, by adjusting the angles of the galvanometer in the X axis and the Y axis, the echo data generated by scanning the edges of the window are acquired based on the laser, and the distances between the upper edge, the lower edge, the left edge, and the right edge of the window and the MEMS LiDAR are further acquired. Whether the field of view of the galvanometer is abnormal or not is determined by respectively comparing the obtained distances with the preset distance range. According to the technical solutions provided in the embodiment of the present application, the abnormality of the field of view of the galvanometer can be detected when the MEMS LiDAR is started, so that the safety problem caused by the abnormal field of view of the galvanometer is avoided, and the reliability and safety of the MEMS LiDAR are improved.

Figure 4:
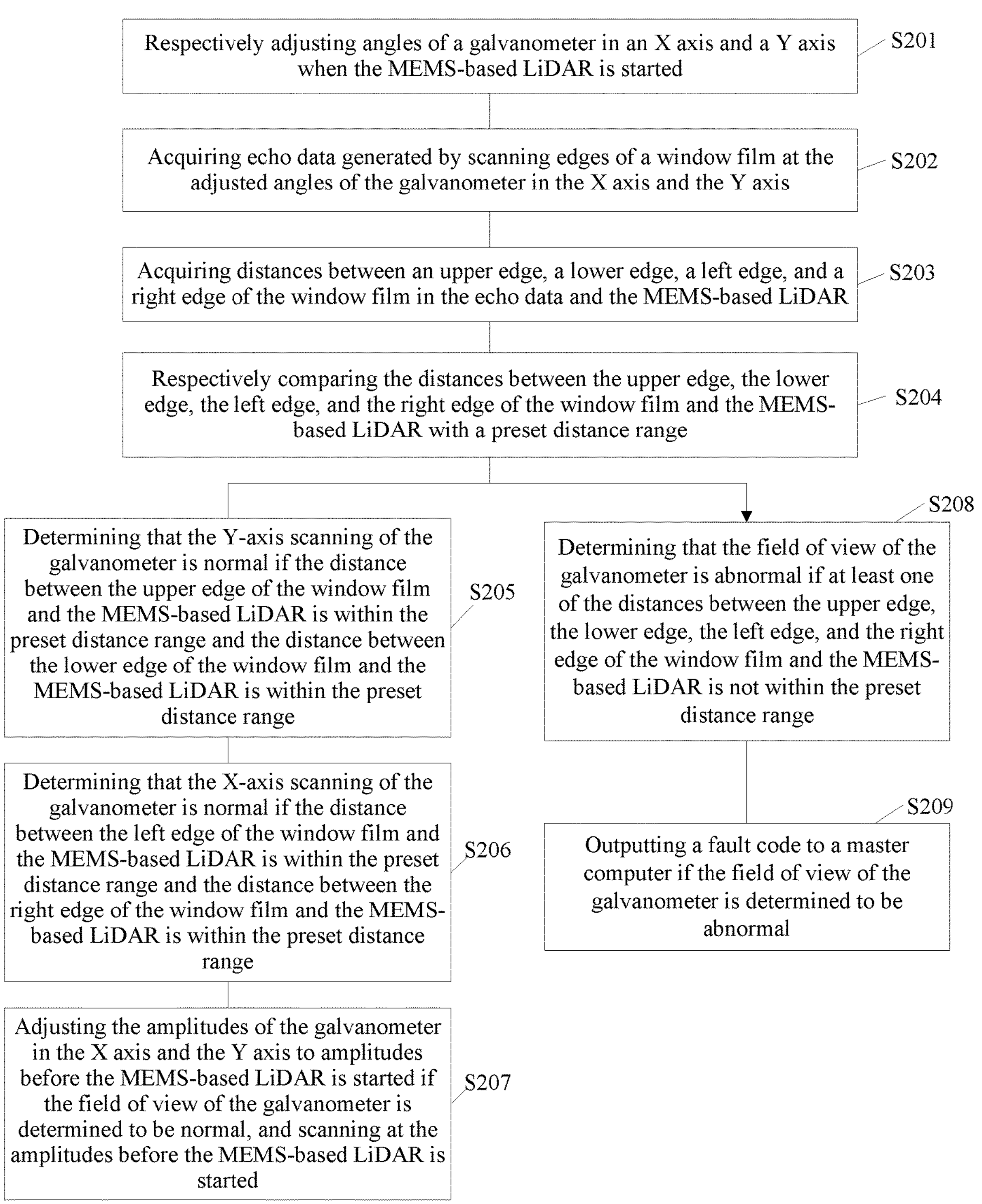
FIG. 4 is a schematic flowchart of an abnormal field of view recognition method according to an embodiment of the present application.

Referring to FIG. 4, a schematic flowchart of an abnormal field of view recognition method is provided according to an embodiment of the present application.

The embodiment of the present application is described by taking a MEMS LiDAR as an example, and the abnormal field of view recognition method may include the following steps.

In S201, angles of the galvanometer in an X axis and a Y axis are adjusted respectively when the MEMS LiDAR is started.

For details, refer to step S101, which is not repeated herein.

In S202, echo data from scanning a window at the adjusted angles of the galvanometer in the X axis and the Y axis are acquired.

For details, refer to step S102, which is not repeated herein.

In S203, distances between an upper edge, a lower edge, a left edge, and a right edge of the window in the echo data and the MEMS LiDAR are acquired.

For details, refer to step S103, which is not repeated herein.

In S204, the distances between the upper edge, the lower edge, the left edge, and the right edge of the window and the MEMS LiDAR are respectively compared with a preset distance range.

The preset distance range may be a target theoretical distance obtained through multiple tests. For example, if the obtained distance between the upper edge of the window and the MEMS LiDAR is compared with the preset distance range, it can be determined that the distance between the upper edge of the window and the MEMS LiDAR is not within the preset distance range.

In S205, the Y-axis scanning of the galvanometer is determined to be normal if the distance between the upper edge of the window and the MEMS LiDAR is within the preset distance range and the distance between the lower edge of the window and the MEMS LiDAR is within the preset distance range.

If the distance between the upper edge of the window and the MEMS LiDAR is within the preset distance range and the distance between the lower edge of the window and the MEMS LiDAR is also within the preset distance range, it can be determined that the Y-axis scanning of the galvanometer is normal. For example, if the distance between the upper edge of the window and the MEMS LiDAR is a first distance and the preset distance range is a first theoretical threshold range, or the distance between the lower edge of the window and the MEMS LiDAR is a second distance and the preset distance range is a second theoretical threshold range, it can be seen that the distances between the upper edge and the lower edge of the window and the MEMS LiDAR are both within the preset distance range, and then the Y-axis scanning of the galvanometer at the current moment is determined to be normal.

In S206, the X-axis scanning of the galvanometer is determined to be normal if the distance between the left edge of the window and the MEMS LiDAR is within the preset distance range and the distance between the right edge of the window and the MEMS LiDAR is within the preset distance range.

If the distance between the left edge of the window and the MEMS LiDAR is within the preset distance range and the distance between the right edge of the window and the MEMS LiDAR is also within the preset distance range, it can be determined that the X-axis scanning of the galvanometer is normal. For example, if the distance between the left edge of the window and the MEMS LiDAR is a first distance and the preset distance range is a first threshold range, or the distance between the right edge of the window and the MEMS LiDAR is a second distance and the preset distance range is a second threshold range, it can be seen that the distances between the upper edge and the lower edge of the window and the MEMS LiDAR are both within the preset distance range, and then the X-axis scanning of the galvanometer at the current moment is determined to be normal.

In S207, the angles of the galvanometer in the X-axis direction and the Y-axis direction are adjusted to previous angles before the MEMS LiDAR is started if the field of view of the galvanometer is determined to be normal, and driving the galvanometer to scan at the previous angles.

If both the X-axis scanning and the Y-axis scanning of the galvanometer are determined to be normal, it can be considered that the field of view is normal, and then the MEMS LiDAR is allowed to be started.

Figure 5:
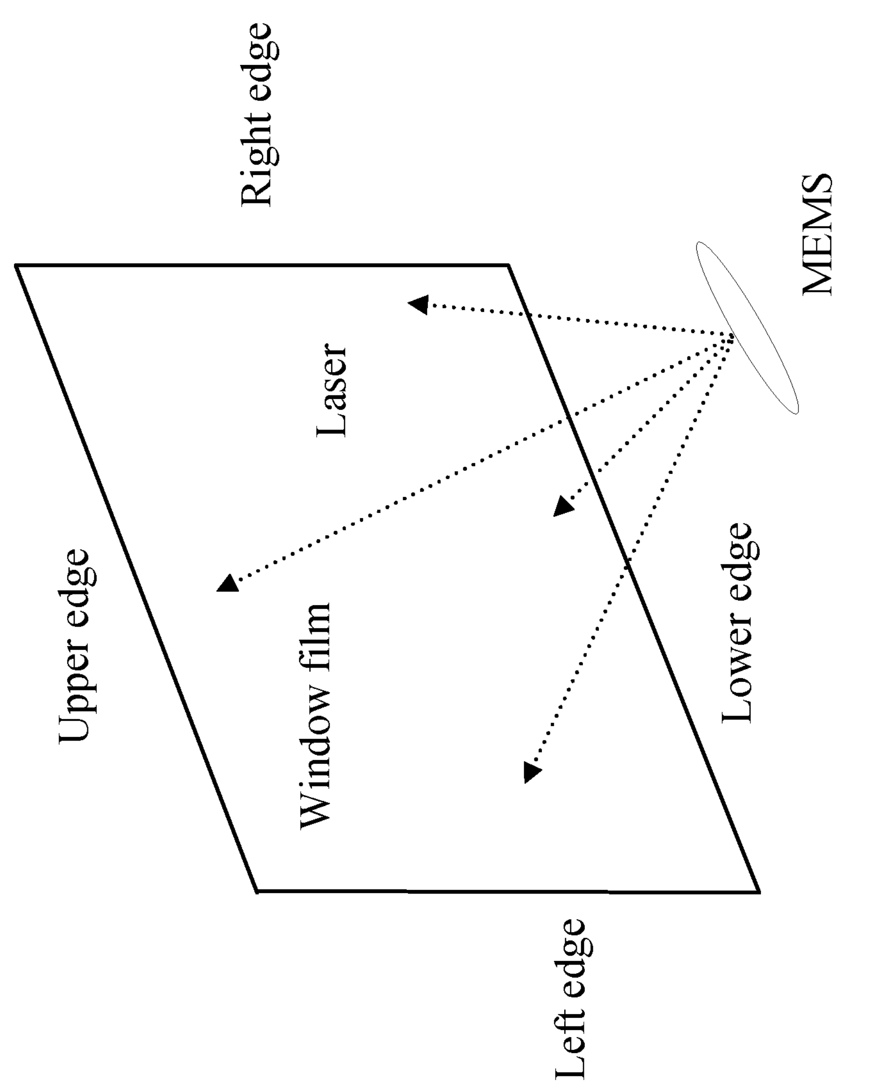
FIG. 5 is an exemplary schematic diagram of an effect of restoring an angle of a galvanometer according to an embodiment of the present application.

The angles of the galvanometer in the X axis and the Y axis are adjusted to the angles before the LiDAR is started, such that the edges of the window cannot be scanned during scanning of the galvanometer. As shown in FIG. 5, the adjusted laser cannot be in contact with the edges of the window during scanning, and thus the MEMS LiDAR can scan normally.

In S208, the field of view of the galvanometer is determined to be abnormal if at least one of the distances between the upper edge, the lower edge, the left edge, and the right edge of the window and the MEMS LiDAR is not within the preset distance range.

Assume at least one of the distances between the upper edge, the lower edge, the left edge, and the right edge of the window and the MEMS LiDAR is not within the preset distance range. For example, assume that the preset distance range is a theoretical threshold range, if at least one of the distances between the upper edge, the lower edge, the left edge, and the right edge of the window and the MEMS LiDAR exceeds the theoretical threshold range, the field of view of the galvanometer is determined to be abnormal.

In S209, a fault code is output to a master computer if the field of view of the galvanometer is determined to be abnormal.

When the field of view of the galvanometer is abnormal, three cases are included: the X-axis scanning of the galvanometer is abnormal but the Y-axis scanning of the galvanometer is normal; the Y-axis scanning of the galvanometer is abnormal but the X-axis scanning of the galvanometer is normal; both the X-axis scanning and the Y-axis scanning of the galvanometer are abnormal. When any one of the three above cases occurs, it can be considered that the field of view is abnormal, the MEMS LiDAR is not allowed to be started, and a fault code is output to the master computer.

The master computer may be an electronic control unit (ECU), also referred to as a "traveling computer," "vehicle-mounted computer," or the like, and is configured to receive a fault code and give a prompt.

In the embodiment of the present application, the obtained distances between the upper edge, the lower edge, the left edge, and the right edge of the window and the MEMS LiDAR are respectively compared with the preset distance range. If the X-axis scanning and the Y-axis scanning of the galvanometer are both normal, the field of view of the galvanometer is determined to be normal, and then the angle of the galvanometer is adjusted to the angle before the MEMS LiDAR is started and the galvanometer starts scanning. If at least one of the X-axis scanning and the Y-axis scanning of the galvanometer is abnormal, the field of view of the galvanometer is determined to be abnormal, the MEMS LiDAR is not allowed to be started, and a fault code is output to the master computer. According to the technical solutions provided in the embodiments of the present application, the field of view of the galvanometer can be detected when the MEMS LiDAR is started, and the starting of the MEMS LiDAR is interrupted when the field of view of the galvanometer is detected to be abnormal, and meanwhile, the fault code is output to the master computer, so that the safety problem caused by the abnormal field of view of the galvanometer is avoided, and the reliability and safety of the MEMS LiDAR are improved.

Figure 6:
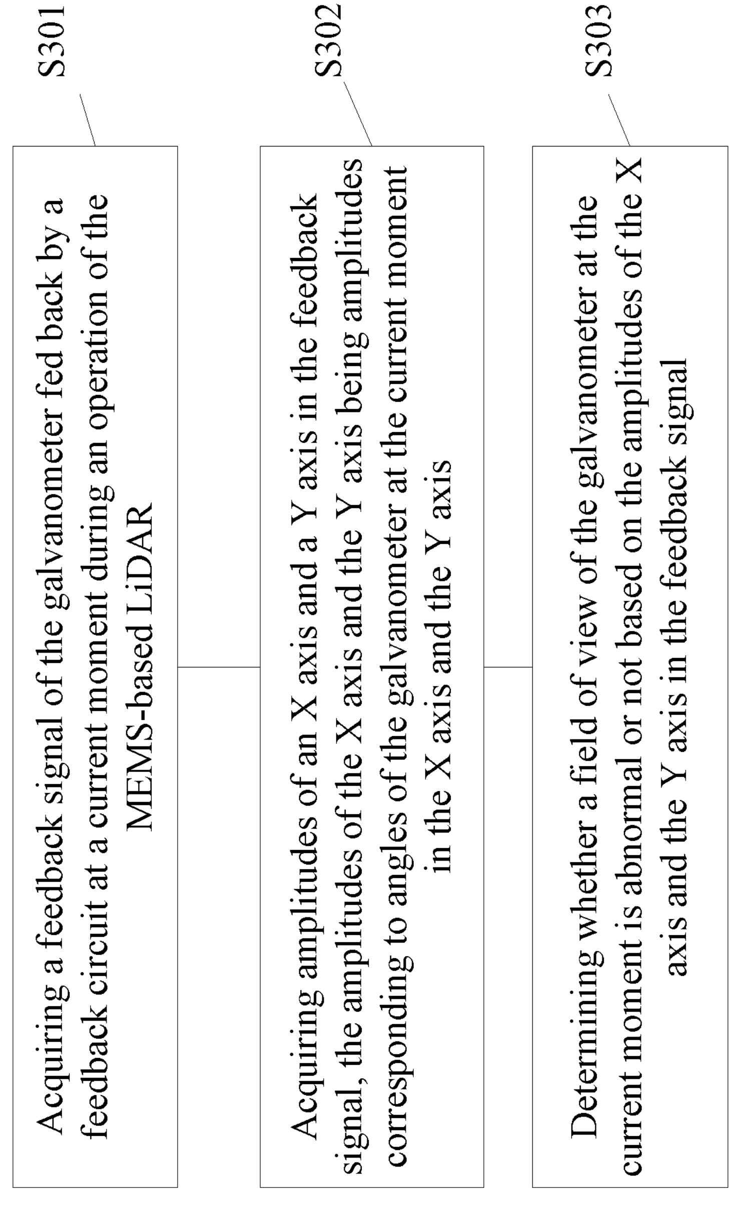
FIG. 6 is a schematic flowchart of an abnormal field of view recognition method according to an embodiment of the present application.

Referring to FIG. 6, a schematic flowchart of an abnormal field of view recognition method is provided according to an embodiment of the present application.

The embodiment of the present application is described by taking a MEMS LiDAR as an example, and the abnormal field of view recognition method may include the following steps.

In S301, a feedback signal from a feedback circuit of the galvanometer at a current moment is acquired when the MEMS LiDAR is operating.

Figure 7:
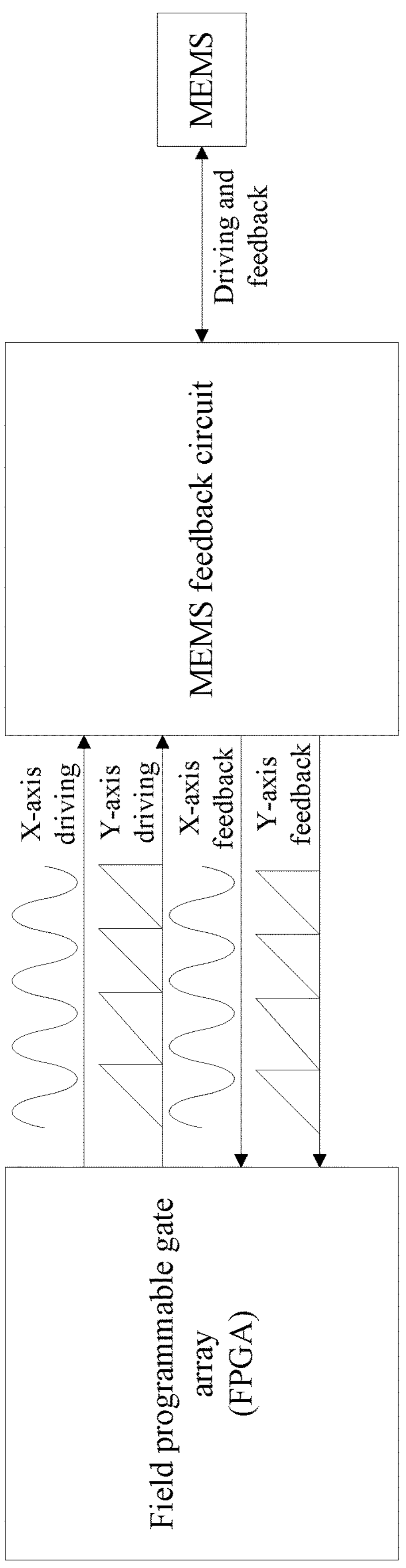
FIG. 7 is a schematic flowchart of a feedback information acquisition method according to an embodiment of the present application.

During the operation of the MEMS LiDAR, the feedback information of the galvanometer at the current moment is acquired based on the feedback circuit. As shown in FIG. 7, the FPGA outputs the driving information to the MEMS feedback circuit, the MEMS feedback circuit drives the galvanometer in the MEMS to rotate and acquires the feedback information, and the MEMS feedback circuit returns the feedback information to the FPGA for analysis.

The feedback information includes amplitudes of the galvanometer in the X axis and the Y axis.

The amplitude of the X axis may be an amplitude scanned in the X-axis direction at the current angle and at the current moment.

The amplitude of the Y axis may be an amplitude scanned in the Y-axis direction at the current angle and at the current moment.

The FPGA has the functions of outputting driving information and receiving and analyzing feedback information, and the FPGA outputs the driving information to enable the MEMS feedback circuit to drive the galvanometer to rotate in a certain mode, and receives the feedback information fed back by the MEMS feedback circuit.

The MEMS feedback circuit receives the driving information output by the FPGA and drives the galvanometer of the MEMS to rotate according to the driving information, and in addition, the MEMS feedback circuit also receives the feedback information fed back by the MEMS and transmits the feedback information to the FPGA for analysis.

It should be noted that the feedback circuit feeds back the information of the current moment, and all conclusions obtained based on the feedback information can only represent the field of view of the galvanometer at the current moment.

In S302, amplitudes of the feedback signal in the direction of an X axis and a Y axis in the feedback signal are acquired, the amplitudes of the feedback signal in the direction of the X axis and the Y axis being angles of the galvanometer at the current moment in the X axis and the Y axis.

The amplitudes of the galvanometer in the X axis and the Y axis in the feedback information are acquired.

The amplitude of the X axis may be an amplitude in the X-axis direction obtained by scanning of the galvanometer at the current angle and at the current moment.

The amplitude of the Y axis may be an amplitude in the Y-axis direction obtained by scanning of the galvanometer at the current angle and at the current moment.

In S303, whether a field of view of the galvanometer at the current moment is abnormal or not is determined based on the amplitudes of the feedback signal in the direction of the X axis and the Y axis.

The amplitudes of the X axis and the Y axis in the feedback information are respectively compared with reference amplitude ranges respectively corresponding thereto. If the amplitudes of the X axis and the Y axis are both within the reference amplitude ranges respectively corresponding thereto, the field of view at the current moment is considered to be normal. If at least one of the amplitudes of the X axis and the Y axis is not within the reference amplitude range, it can be considered that the field of view of the galvanometer at the current moment is abnormal.

Figure 8:
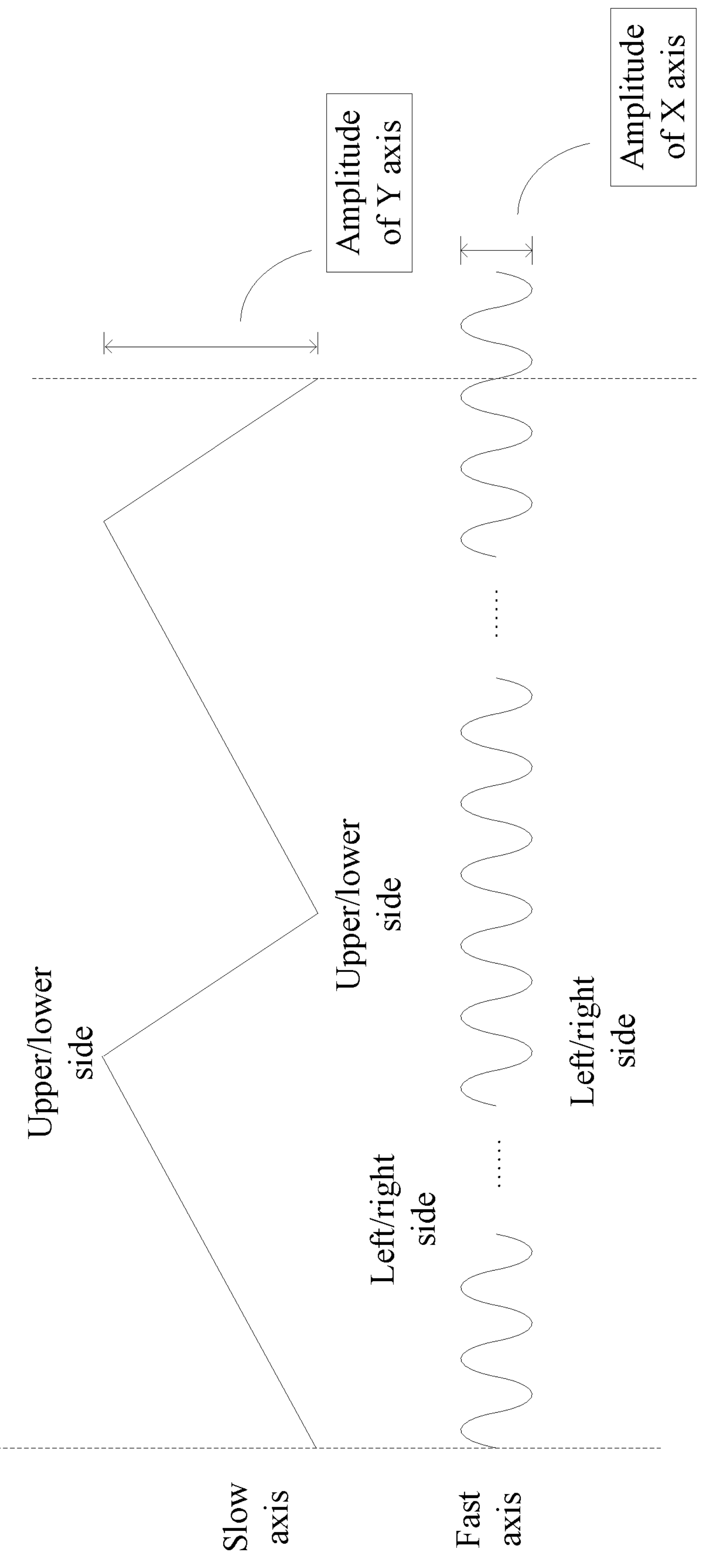
FIG. 8 is an exemplary schematic diagram of amplitudes of an X axis and a Y axis according to an embodiment of the present application.

The amplitudes of the X axis and the Y axis may be as follows: if a waveform scanned in the X-axis direction is a sine wave, the amplitude of the galvanometer in the X axis is a vertical distance between a peak and a valley in one period; and if a waveform scanned in the Y-axis direction is a triangular wave, the amplitude of the galvanometer in the Y axis is a vertical distance between a highest point and a lowest point in one period, as shown in FIG. 8.

The reference amplitude range may be theoretical amplitude data or current calibration amplitude data of the MEMS. The reference amplitude range is a theoretical threshold range. If the amplitudes of the galvanometer in the X axis and the Y axis are both within the theoretical threshold range, the field of view of the galvanometer at the current moment is considered to be normal, and otherwise, the field of view of the galvanometer at the current moment is considered to be abnormal.

In the embodiment of the present application, whether the field of view of the galvanometer at the current moment is abnormal or not is determined through the comparison between the amplitudes of the galvanometer in the X axis and the Y axis and the reference amplitude ranges respectively corresponding thereto by acquiring the amplitudes of the galvanometer in the X axis and the Y axis during the operation of the MEMS LiDAR. According to the technical solutions provided in the embodiments of the present application, whether the field of view of the galvanometer during the operation of the MEMS LiDAR is abnormal or not can be determined in real time, so that the safety problem caused by the abnormal field of view of the galvanometer is avoided, and the safety and reliability of the MEMS LiDAR are improved.

When the MEMS LiDAR is powered on and started, the state of the galvanometer is detected firstly. The driving module controls the galvanometer of the MEMS to adjust the angle, then the MEMS LiDAR transmits laser to pass through the window and receives the laser reflected by the object, and the MEMS LiDAR recognizes whether edge data of the window exist or not from the obtained data so as to confirm whether the field of view of the galvanometer of the MEMS LiDAR is abnormal or not. If the edge data exist and the field of view is normal, the point cloud data are transmitted to the master computer, the angle of the galvanometer is adjusted to the angle before the MEMS LiDAR is started, and the MEMS LiDAR is started to operate; if no edge data exist and the field of view is abnormal, the fault processing module is informed to perform fault processing, a fault code is output to the master computer, and the MEMS LiDAR cannot normally operate. Then, when the MEMS LiDAR operates, the MEMS LiDAR determines whether the galvanometer operates normally or not according to the feedback information of the galvanometer at the current moment. If the scanning of the galvanometer at the current moment in the X axis and the Y axis is determined to be normal, the MEMS LiDAR is kept to operate normally, and if the field of view of the galvanometer of the MEMS at the current moment is determined to be abnormal, the fault processing module is informed to perform fault processing, and a fault code is output to the master computer. According to the recognition method provided in the embodiment of the present application, whether the field of view of the galvanometer is abnormal or not is confirmed by detecting the edge data at the initial stage of starting, and whether the field of view of the galvanometer is abnormal or not is confirmed by monitoring the feedback information in real time during the operation. Whether the working state of the galvanometer is normal or not can be timely and accurately confirmed in the whole working period of the MEMS LiDAR, so that the abnormal field of view of the galvanometer is avoided, and the safety and reliability of the MEMS LiDAR during the whole working process are ensured.

The abnormal field of view recognition method during starting disclosed in above steps S201 to S209 and the abnormal field of view recognition method during operation disclosed in the above steps S301 to S303 may be used in cooperation with each other to monitor the whole working process of the MEMS LiDAR, or may be used in the MEMS LiDAR alone, that is, one of the recognition methods may be used alone as needed, and no limitation is made herein.

Figure 9:
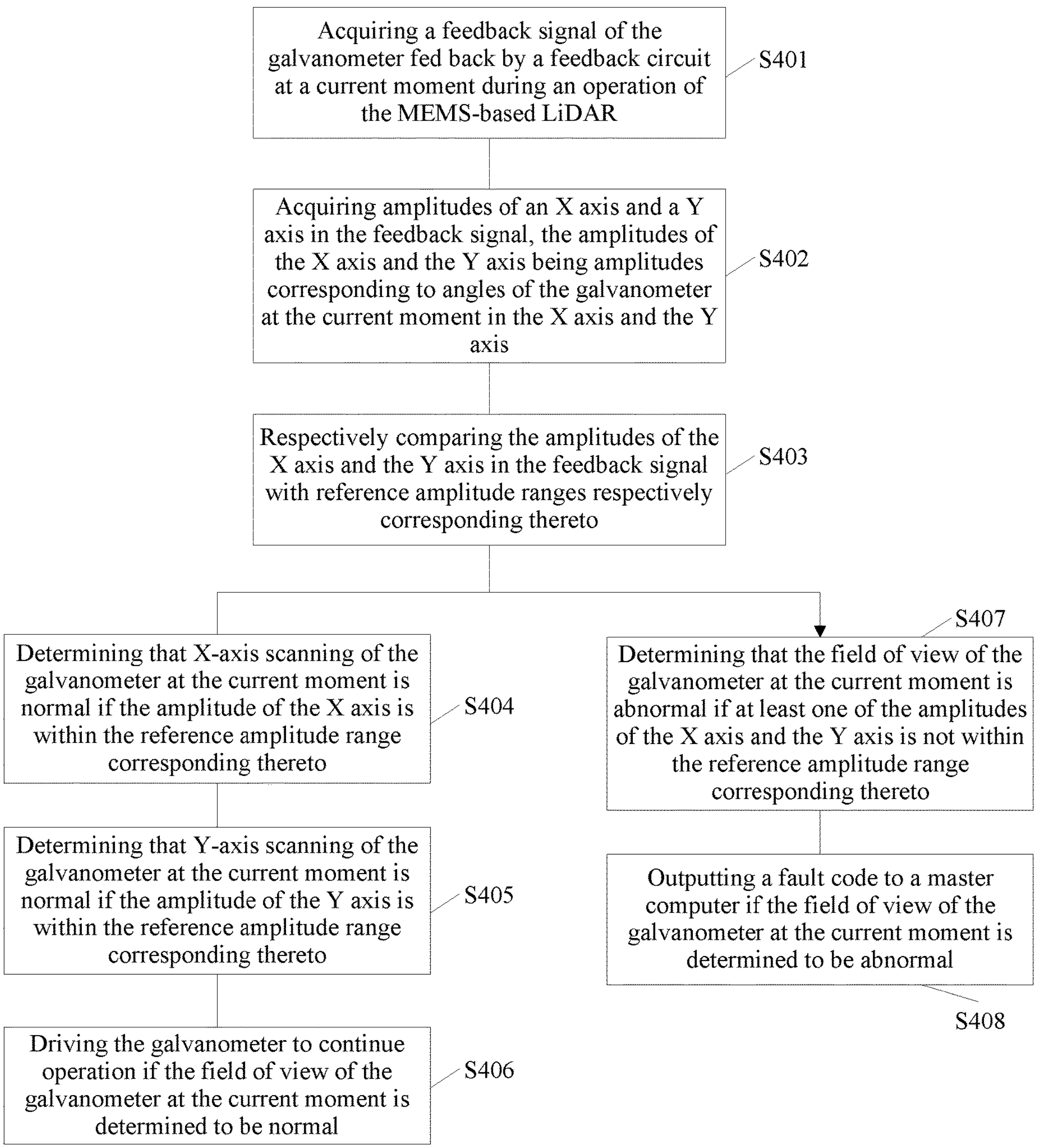
FIG. 9 is a schematic flowchart of an abnormal field of view recognition method according to an embodiment of the present application.

Referring to FIG. 9, a schematic flowchart of an abnormal field of view recognition method is provided according to an embodiment of the present application.

The embodiment of the present application is described by taking a MEMS LiDAR as an example, and the abnormal field of view recognition method may include the following steps.

In S401, a feedback signal from a feedback circuit of the galvanometer at a current moment is acquired when the MEMS LiDAR is operating.

For details, refer to step S301, which is not repeated herein.

In S402, amplitudes of the feedback signal in the direction of an X axis and a Y axis are acquired, the amplitudes of the feedback signal in the directions of the X axis and the Y axis being angles of the galvanometer at the current moment in the X axis and the Y axis.

For details, refer to step S302, which is not repeated herein.

In S403, the amplitudes of the feedback signal in the directions of the X axis and the Y axis are respectively compared with reference amplitude ranges respectively corresponding thereto.

Whether the amplitudes of the X axis and the Y axis at the current moment are within the reference amplitude range or not is determined by respectively comparing the amplitudes of the X axis and the Y axis in the feedback information with the reference amplitude ranges respectively corresponding thereto, providing a determination basis for subsequently determining whether the field of view is abnormal or not.

For example, if the amplitude of the X axis in the feedback information is a first amplitude, the reference amplitude range corresponding thereto is a first theoretical amplitude, and the first amplitude is within the first theoretical amplitude range, it is determined that the amplitude of the galvanometer in the X axis at the current moment is within the reference amplitude; if the amplitude of the Y axis in the feedback information is a second amplitude, the reference amplitude range corresponding thereto is a second theoretical amplitude, and the second amplitude is within the second theoretical amplitude range, it is determined that the amplitude of the galvanometer in the Y axis at the current moment is not within the reference amplitude range.

In S404, it is determined that X-axis scanning of the galvanometer at the current moment is normal if the amplitude of the X axis is within the reference amplitude range corresponding thereto.

If the amplitude of the X axis is within the reference amplitude range, it is determined that the X-axis scanning of the galvanometer at the current moment is normal. For example, if a waveform scanned in the X axis is a sine wave, a vertical distance between a peak and a valley in the current period is the first amplitude, the reference amplitude range is the first theoretical amplitude, and the first amplitude is within the first theoretical amplitude range, the X-axis scanning of the galvanometer at the current moment is determined to be normal.

In S405, it is determined that Y-axis scanning of the galvanometer at the current moment is normal if the amplitude of the Y axis is within the reference amplitude range corresponding thereto.

If the amplitude of the Y axis is within the reference amplitude range, it is determined that the Y-axis scanning of the galvanometer at the current moment is normal. For example, if a waveform scanned in the Y axis is a triangular wave, a vertical distance between a highest point and a lowest point in the current period is the second amplitude, the reference amplitude range is the second theoretical amplitude, and the second amplitude is within the second theoretical amplitude range, the Y-axis scanning of the galvanometer at the current moment is determined to be normal.

In S406, the galvanometer is driven to continue operation if the field of view of the galvanometer at the current moment is determined to be normal.

If both the X-axis scanning and the Y-axis scanning of the galvanometer at the current moment are determined to be normal, the field of view of the galvanometer at the current moment can be determined to be normal, and the galvanometer is driven to continue operation.

In S407, it is determined that the field of view of the galvanometer at the current moment is abnormal if at least one of the amplitudes of the X axis and the Y axis is not within the reference amplitude range corresponding thereto.

Assume at least one of the amplitudes of the galvanometer in the X axis and the Y axis is not within the reference amplitude range corresponding thereto, which includes the following cases. The amplitude of the galvanometer in the X axis is not within the reference amplitude range corresponding thereto but the amplitude of the galvanometer in the Y axis is within the reference amplitude range corresponding thereto; for example, the amplitude of the galvanometer in the X axis is a first amplitude and the reference amplitude range corresponding thereto is a first theoretical amplitude, the amplitude of the Y axis is a second amplitude and the reference amplitude range corresponding thereto is a second theoretical amplitude, the first amplitude is not within the first theoretical amplitude range, and the second amplitude is within the second theoretical amplitude range. The amplitude of the galvanometer in the X axis is within the reference amplitude range corresponding thereto but the amplitude of the galvanometer in the Y axis is not within the reference amplitude range corresponding thereto; for example, the amplitude of the galvanometer in the X axis is a first amplitude and the reference amplitude range corresponding thereto is a first theoretical amplitude, the amplitude of the Y axis is a second amplitude and the reference amplitude range corresponding thereto is a second theoretical amplitude, the first amplitude is within the first theoretical amplitude range, and the second amplitude is not within the second theoretical amplitude range. Neither of the amplitudes of the galvanometer in the X axis and the Y axis is within its respective reference amplitude range corresponding thereto; for example, the amplitude of the galvanometer in the X axis is a first amplitude and the reference amplitude range corresponding thereto is a first theoretical amplitude, the amplitude of the Y axis is a second amplitude and the reference amplitude range corresponding thereto is a second theoretical amplitude, the first amplitude is not within the first theoretical amplitude range, and the second amplitude is not within the second theoretical amplitude range.

If any one of the above three cases is obtained from the feedback information fed back by the feedback circuit at the current moment, it is determined that the field of view of the galvanometer at the current moment is abnormal.

In S408, a fault code is output to a master computer if the field of view of the galvanometer at the current moment is determined to be abnormal.

If the field of view of the galvanometer at the current moment is determined to be abnormal, a fault code needs to be output to the master computer to prompt a user to deal with this case accordingly.

The master computer may be an electronic control unit (ECU), also referred to as a "traveling computer," "vehicle-mounted computer," or the like, and is configured to receive a fault code and give a prompt.

According to the technical solutions provided in the embodiments of the present application, whether the field of view of the galvanometer at the current moment is abnormal or not can be determined based on the amplitudes of the galvanometer at the current moment in the X axis and the Y axis. If the field of view of the galvanometer at the current moment is normal, the MEMS LiDAR is kept to operate normally; and if the field of view of the galvanometer at the current moment is abnormal, the fault code is output to the master computer to prompt a user to deal with this case accordingly, so that whether the field of view of the galvanometer is abnormal or not during the operation of the MEMS LiDAR can be determined in real time, thereby avoiding the safety problem caused by the abnormal field of view of the galvanometer, and improving the safety and reliability of the MEMS LiDAR.

The following are device embodiments of the present application that may be used to implement the method embodiments of the present application. For details that are not disclosed in the device embodiments of the present application, reference is made to the method embodiments of the present application.

Figure 10:
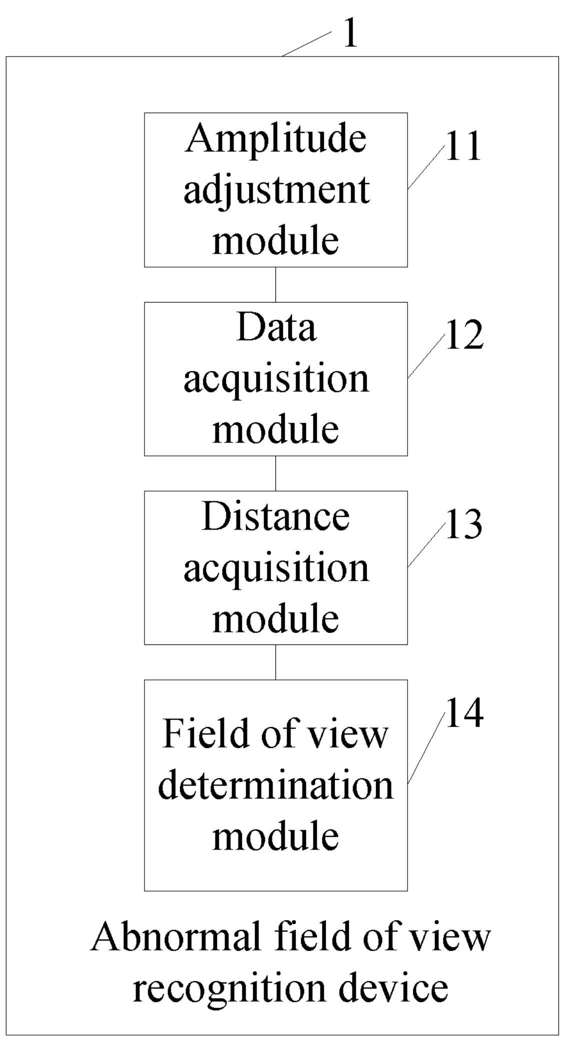
FIG. 10 is a schematic structural diagram of an abnormal field of view recognition device according to an embodiment of the present application.

Referring to FIG. 10, a schematic structural diagram of an abnormal field of view recognition device is provided according to an exemplary embodiment of the present application. The abnormal field of view recognition device may be implemented by software, hardware, or a combination of both, as all or a part of a terminal. The device 1 includes an angle adjustment module 11, a data acquisition module 12, a distance acquisition module 13, and a field of view determination module 14.

The angle adjustment module 11 is configured to respectively adjust angles of the galvanometer in an X axis and a Y axis when the MEMS LiDAR is started.

The data acquisition module 12 is configured to acquire echo data generated by scanning a window at the adjusted angles of the galvanometer in the X axis and the Y axis.

The distance acquisition module 13 is configured to acquire distances, from the echo data, between an upper edge, a lower edge, a left edge, and a right edge of the window and the MEMS LiDAR.

The field of view determination module 14 is configured to determine whether a field of view of the galvanometer is abnormal or not based on the distances between the upper edge, the lower edge, the left edge, and the right edge of the window and the MEMS LiDAR.

Figure 11:
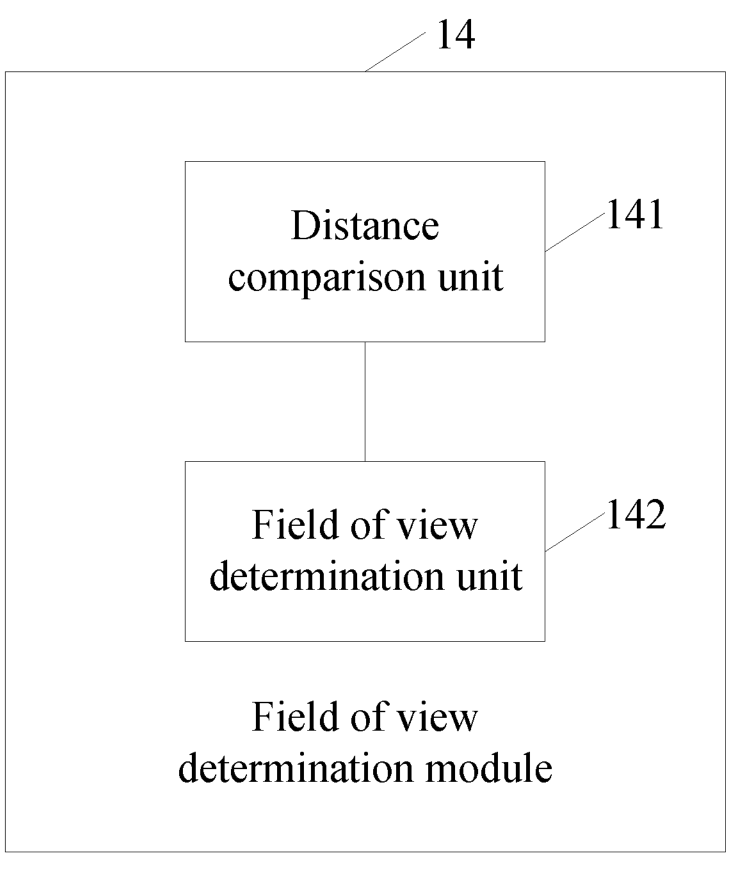
FIG. 11 is a schematic structural diagram of a field of view determination module according to an embodiment of the present application.

In some embodiments, as shown in FIG. 11, the field of view determination module 14 includes:

a distance comparison unit 141, configured to respectively compare the distances between the upper edge, the lower edge, the left edge, and the right edge of the window and the MEMS LiDAR with a preset distance range; and a field of view determination unit 142, configured to determine that the field of view of the galvanometer is normal if the distances between the upper edge, the lower edge, the left edge, and the right edge of the window and the MEMS LiDAR are all within the preset distance range;

the field of view determination unit 142, also configured to determine that the field of view of the galvanometer is abnormal if at least one of the distances between the upper edge, the lower edge, the left edge, and the right edge of the window and the MEMS LiDAR is not within the preset distance range.

Figure 12:
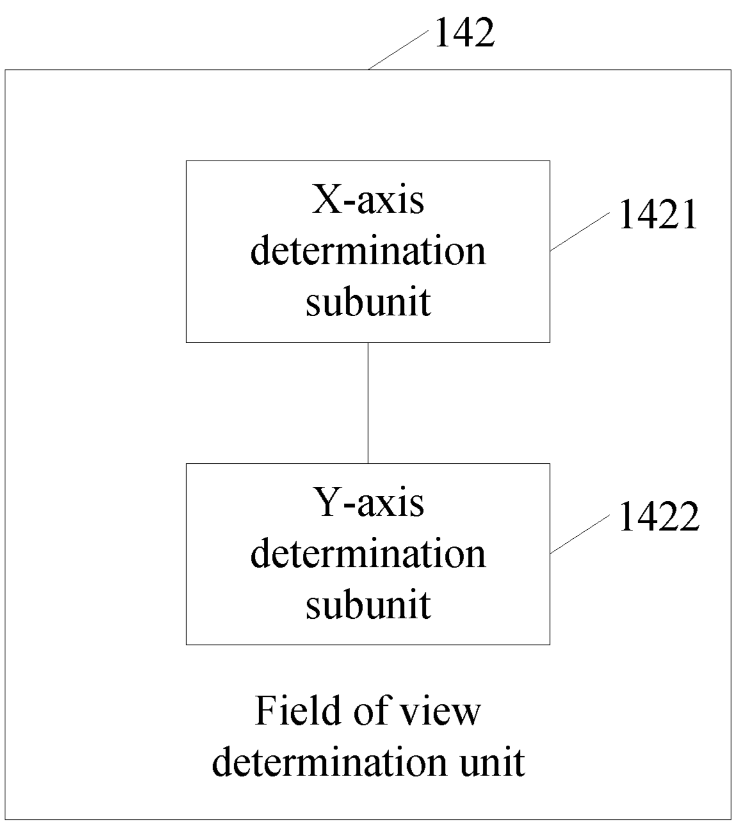
FIG. 12 is a schematic structural diagram of a field of view determination unit according to an embodiment of the present application.

In some embodiments, as shown in FIG. 12, the field of view determination unit 142 includes:

an X-axis determination subunit 1421, configured to determine that the X-axis scanning of the galvanometer is normal if the distance between the upper edge of the window and the MEMS LiDAR is within the preset distance range and the distance between the lower edge of the window and the MEMS LiDAR is within the preset distance range; and a Y-axis determination subunit 1422, configured to determine that the Y-axis scanning of the galvanometer is normal if the distance between the left edge of the window and the MEMS LiDAR is within the preset distance range and the distance between the right edge of the window and the MEMS LiDAR is within the preset distance range.

Figure 13:
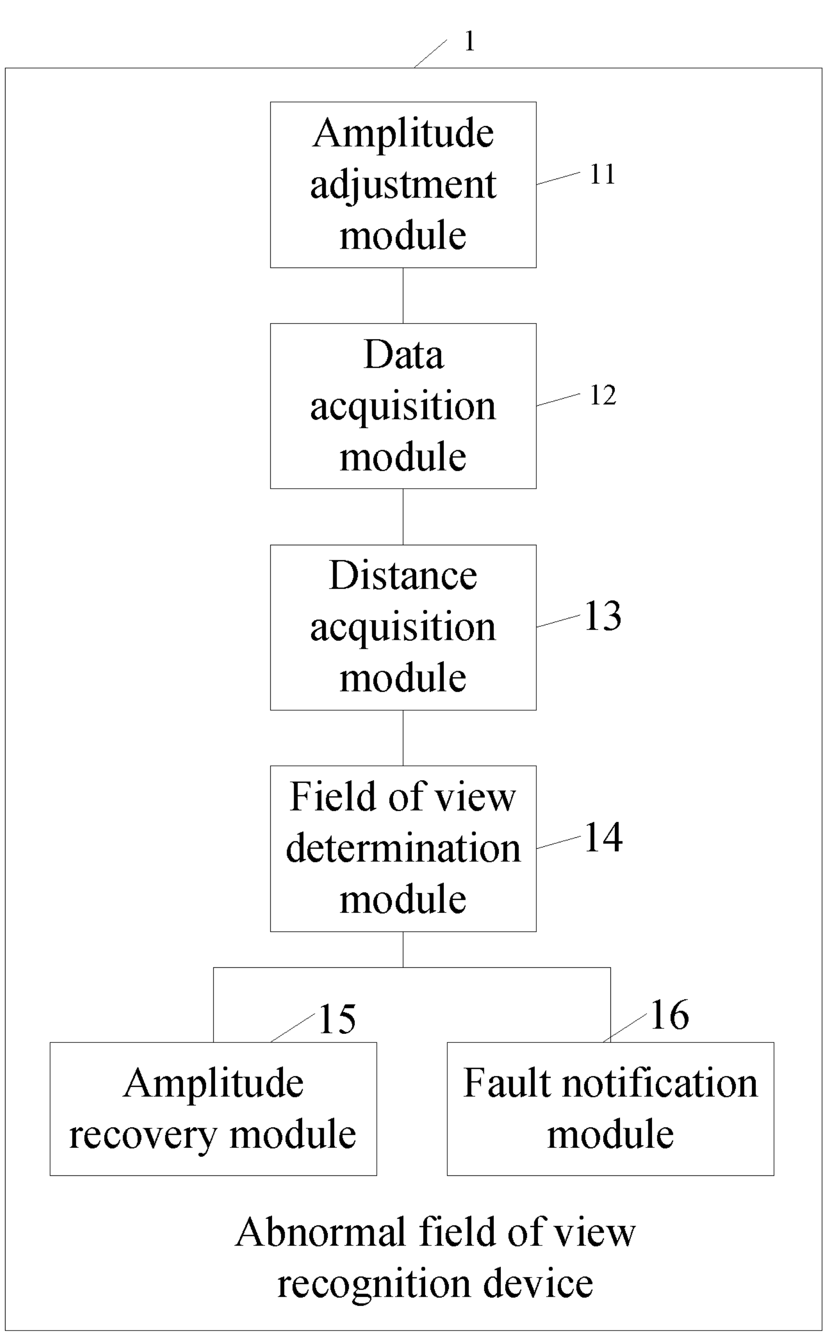
FIG. 13 is a schematic structural diagram of an abnormal field of view recognition device according to an embodiment of the present application.

In Some Embodiments, as Shown in FIG. 13, the Device 1 Also Includes:

an angle recovery module 15, configured to adjust the angles of the galvanometer in the X-axis direction and the Y-axis direction to previous angles before the LiDAR is started if the field of view of the galvanometer is determined to be normal, and driving the galvanometer to scan at the previous angles; and a fault notification module 16, configured to output a fault code to a master computer if the field of view of the galvanometer is determined to be abnormal.

According to the technical solutions provided in the embodiments of the present application, the field of view of the galvanometer can be detected when the MEMS LiDAR is started, and the starting of the MEMS LiDAR is interrupted when the field of view of the galvanometer is detected to be abnormal, and meanwhile, the fault code is output to the master computer, so that the safety problem caused by the abnormal field of view of the galvanometer is avoided, and the reliability and safety of the MEMS LiDAR are improved.

Figure 14:
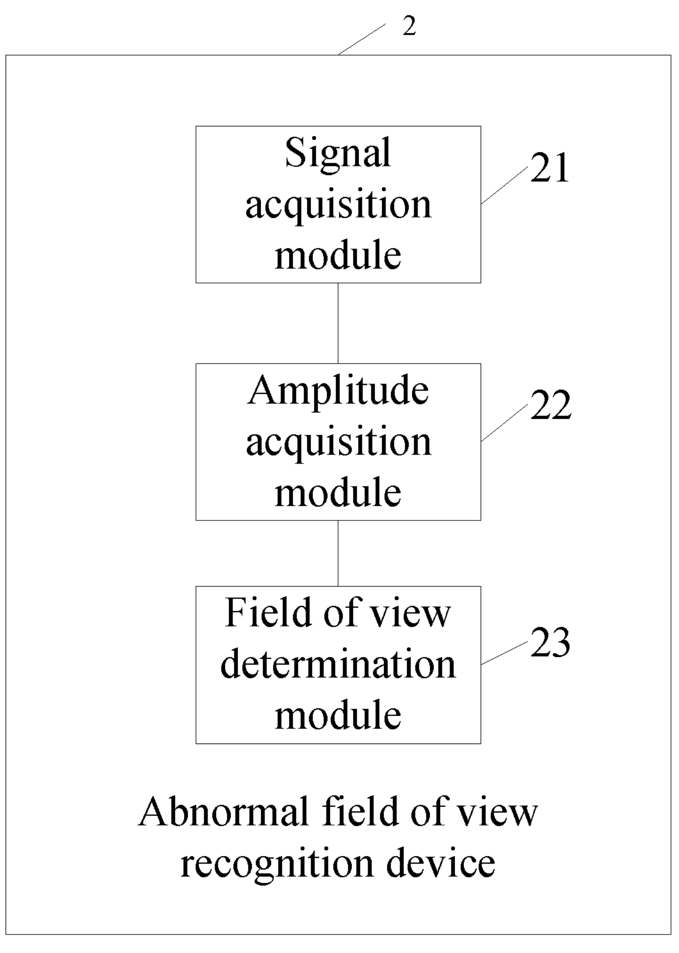
FIG. 14 is a schematic structural diagram of an abnormal field of view recognition device according to an embodiment of the present application.

Referring to FIG. 14, a schematic structural diagram of an abnormal field of view recognition device is provided according to an exemplary embodiment of the present application. The device 2 includes a signal acquisition module 21, an amplitude acquisition module 22, and a field of view determination module 23.

The signal acquisition module 21 is configured to acquire a feedback signal from a feedback circuit of the galvanometer at a current moment when the MEMS LiDAR is operating.

The amplitude acquisition module 22 is configured to acquire amplitudes of the feedback signal in the direction of an X axis and a Y axis. The amplitudes of the feedback signal in the direction of the X axis and the Y axis are angles of the galvanometer at the current moment in the X axis and the Y axis.

The field of view determination module 23 is configured to determine whether a field of view of the galvanometer at the current moment is abnormal or not based on the amplitudes of the feedback signal in the direction of the X axis and the Y axis.

Figure 15:
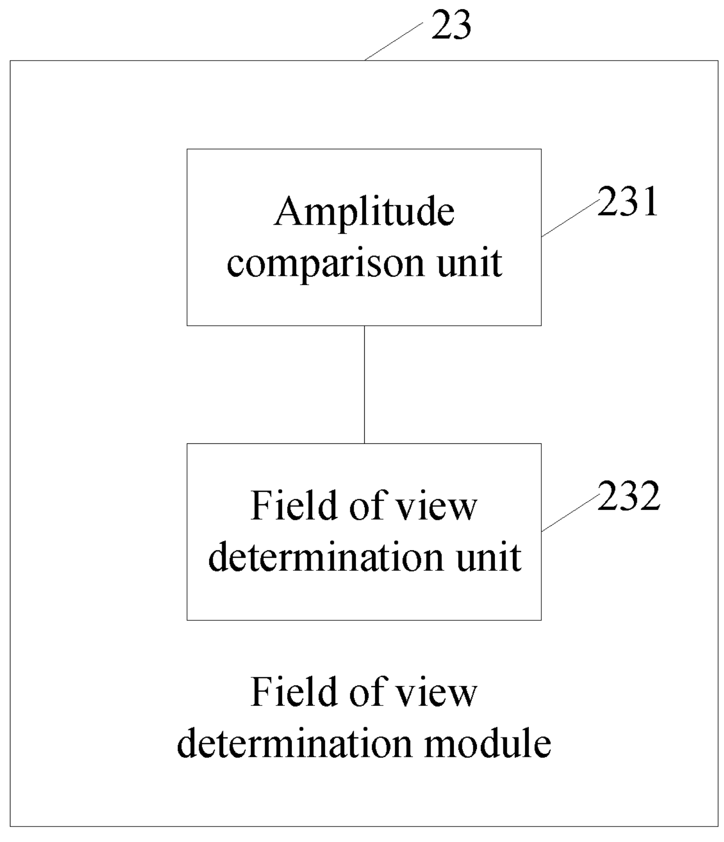
FIG. 15 is a schematic structural diagram of a field of view determination module according to an embodiment of the present application.

In some embodiments, as shown in FIG. 15, the field of view determination module 23 includes:

an amplitude comparison unit 231, configured to respectively compare the amplitudes of the feedback signal in the direction of the X axis and the Y axis with reference amplitude ranges respectively corresponding thereto; and a field of view determination unit 232, configured to determine that the field of view of the galvanometer at the current moment is normal if the amplitudes of the X axis and the Y axis are both within the reference amplitude ranges respectively corresponding thereto.

The field of view determination unit 232 is also configured to determine that the field of view of the galvanometer at the current moment is abnormal if at least one of the amplitudes of the X axis and the Y axis is not within the reference amplitude range corresponding thereto.

Figure 16:
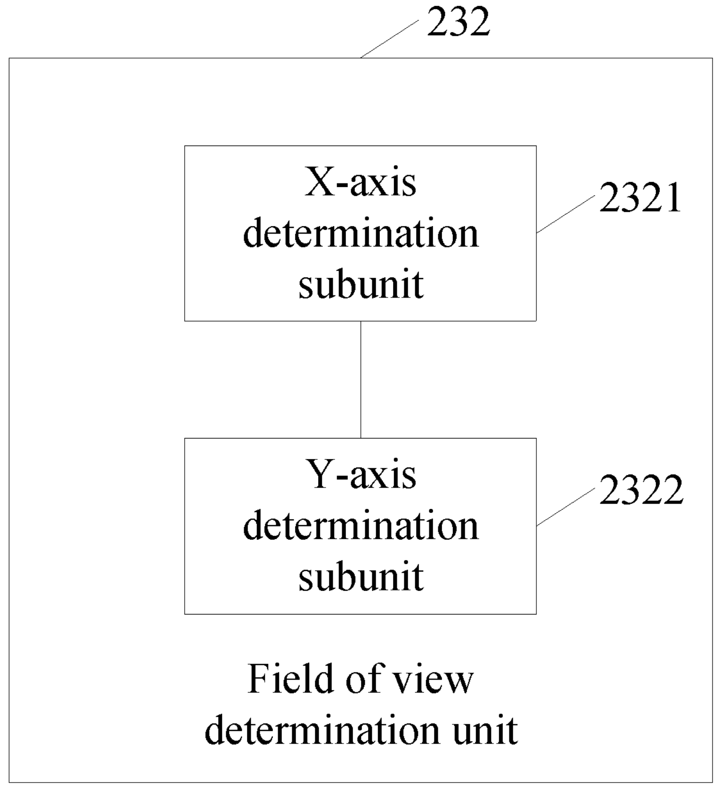
FIG. 16 is a schematic structural diagram of a field of view determination unit according to an embodiment of the present application.

In some embodiments, as shown in FIG. 16, the field of view determination unit 232 includes:

an X-axis determination subunit 2321, configured to determine that X-axis scanning of the galvanometer at the current moment is normal if the amplitude of the X axis is within the reference amplitude range corresponding thereto; and a Y-axis determination subunit 2322, configured to determine that Y-axis scanning of the galvanometer at the current moment is normal if the amplitude of the Y axis is within the reference amplitude range corresponding thereto.

Figure 17:
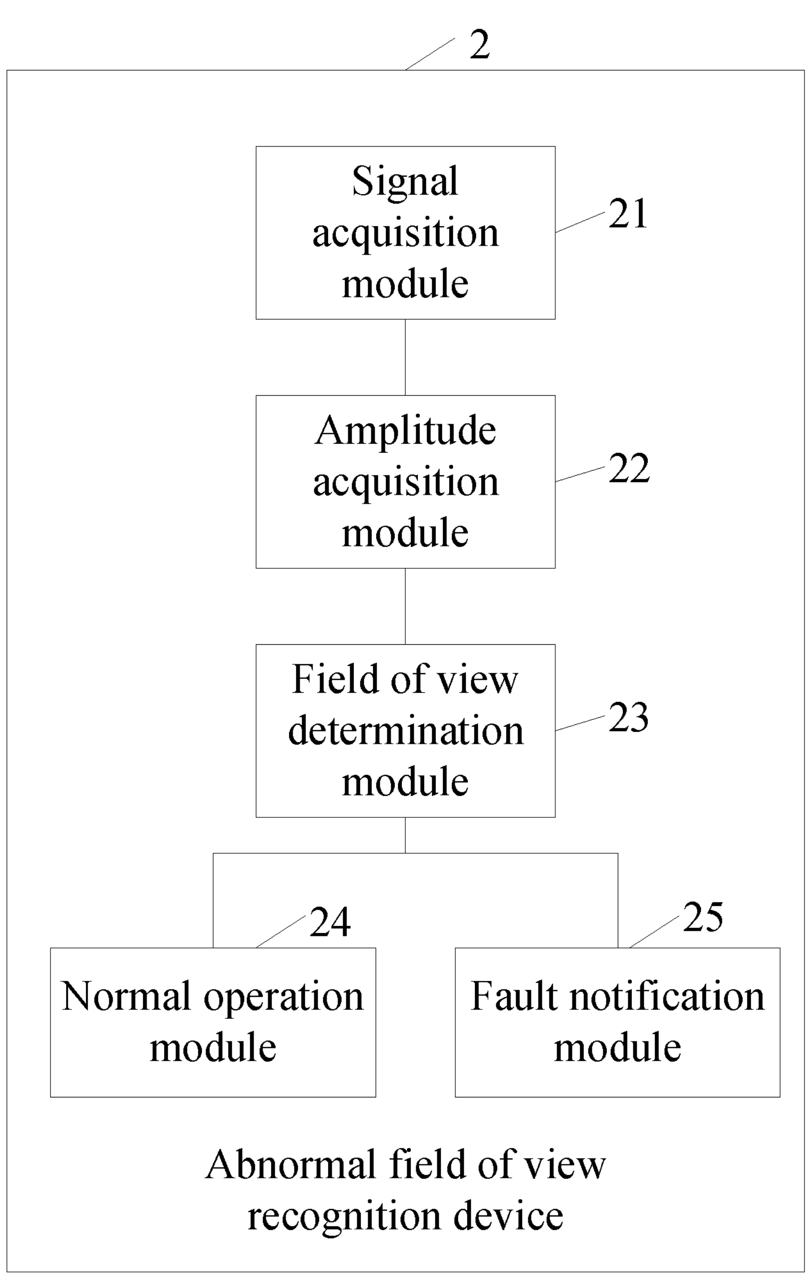
FIG. 17 is a schematic structural diagram of an abnormal field of view recognition device according to an embodiment of the present application.

In Some Embodiments, as Shown in FIG. 17, the Device 2 Also Includes:

a normal operation module 24, configured to drive the galvanometer to continue operation if the field of view of the galvanometer at the current moment is determined to be normal; and a fault notification module 25, configured to output a fault code to a master computer if the field of view of the galvanometer at the current moment is determined to be abnormal.

According to the technical solutions provided in the embodiments of the present application, whether the field of view of the galvanometer at the current moment is abnormal or not can be determined based on the amplitudes of the galvanometer at the current moment in the X axis and the Y axis. If the field of view of the galvanometer at the current moment is normal, the MEMS LiDAR is kept to operate normally; and if the field of view of the galvanometer at the current moment is abnormal, the fault code is output to the master computer to prompt a user to deal with this case accordingly, so that whether the field of view of the galvanometer is abnormal or not during the operation of the MEMS LiDAR can be determined in real time, thereby avoiding the safety problem caused by the abnormal field of view of the galvanometer, and improving the safety and reliability of the MEMS LiDAR.

It should be noted that, when the abnormal field of view recognition device according to the above embodiments implements the abnormal field of view recognition method, only the division of the above functional modules is illustrated, and in practical applications, the above function distribution may be completed by different functional modules as needed. That is, the internal structure of the equipment is divided into different functional modules to complete all or part of the above described functions. In addition, the abnormal field of view recognition device and the abnormal field of view recognition method according to the above embodiments belong to the same concept, and the detailed implementation process thereof is shown in the method embodiments, which is not repeated herein.

The above serial numbers of the embodiments of the present application are merely for description, and do not represent the advantages and disadvantages of the embodiments.

An embodiment of the present application also provides a computer storage medium which may have a plurality of instructions stored thereon, wherein the instructions, when loaded and executed by a processor, are adapted to implement the method steps in the embodiments shown in FIG. 1 to FIG. 9, and the specific implementation process may refer to specific descriptions in the embodiments shown in FIG. 1 to FIG. 9, which is not repeated herein.

The present application also provides a MEMS LiDAR having at least one instruction stored thereon, wherein the at least one instruction, when loaded and executed by a processor, implements the specific description of the embodiments shown in FIG. 1 to FIG. 9, which is not repeated herein.

Figure 18:
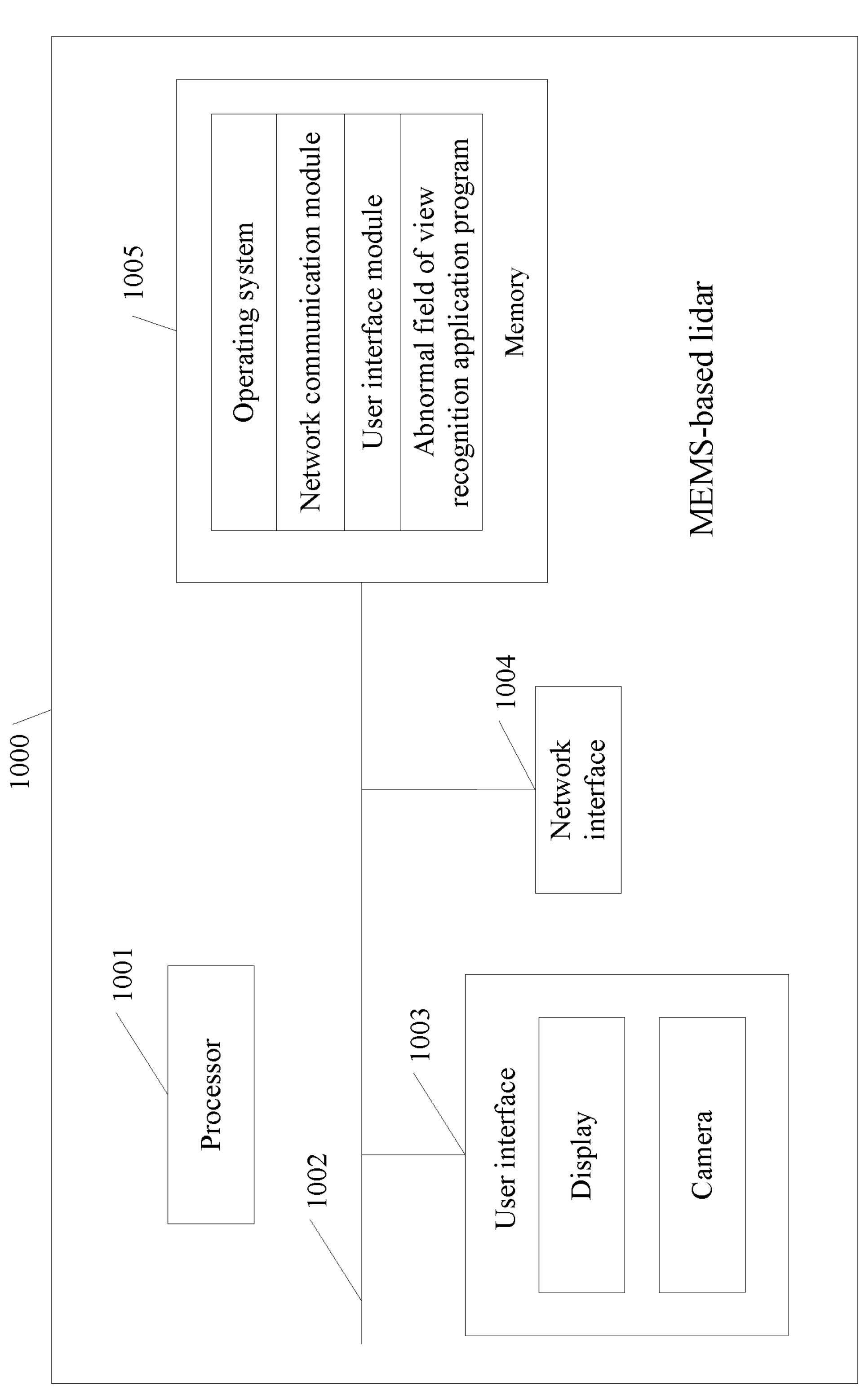
FIG. 18 is a schematic structural diagram of a MEMS LiDAR according to an embodiment of the present application.

Referring to FIG. 18, a schematic structural diagram of a MEMS LiDAR is provided according to an embodiment of the present application. As shown in FIG. 18, the mobile terminal 1000 may include at least one processor 1001, at least one network interface 1004, a user interface 1003, a memory 1005, and at least one communication bus 1002.

The communication bus 1002 is configured to implement connection communication among these components.

The user interface 1003 may include a display and a camera, and the optional user interface 1003 may also include a standard wired interface and a wireless interface.

The network interface 1004 may optionally include a standard wired interface and a wireless interface (e.g., WI-FI interface).

The processor 1001 may include one or more processing cores. The processor 1001 connects all parts of the entire MEMS LiDAR 1000 by utilizing various interfaces and circuits, implements various functions of the MEMS LiDAR 1000, and processes data by running or executing instructions, programs, code sets, or instruction sets stored in the memory 1005 and by calling data stored in the memory 1005. In some embodiments, the processor 1001 may be implemented in at least one hardware form of digital signal processing (DSP), field-programmable gate array (FPGA), and programmable logic array (PLA). The processor 1001 may integrate one of or a combination of a central processing unit (CPU), a graphics processing unit (GPU), a modem, or the like. The CPU mainly processes an operating system, a user interface, an application program, or the like. The GPU is configured to render and draw the content required to be displayed by the display. The modem is configured to handle wireless communications. It can be understood that the above modem may not be integrated into the processor 1001, and may be implemented by a single chip.

The memory 1005 may include a random access memory (RAM) or a read-only memory (ROM). In some embodiments, the memory 1005 includes a non-transitory computer-readable storage medium. The memory 1005 may be configured to store an instruction, a program, a code, a code set, or an instruction set. The memory 1005 may include a storage program area and a storage data area, wherein the storage program area may store instructions for implementing an operating system, instructions for at least one function (such as a touch function, a sound playing function, and an image playing function), instructions for implementing the above method embodiments, or the like. The storage data area may store data and the like referred to in the above method embodiments. The memory 1005 may also optionally be at least one storage device located remotely from the processor 1001. As shown in FIG. 18, the memory 1005, as a computer storage medium, may include an operating system, a network communication module, a user interface module, and an abnormal field of view recognition application program.

In the mobile terminal 1000 shown in FIG. 18, the user interface 1003 is mainly configured as an interface for providing inputs for users and acquiring data input by users. The processor 1001 may be configured to call the abnormal field of view recognition application program stored in the memory 1005, and the specific operations are performed as follows:

respectively adjusting angles of the galvanometer in an X axis and a Y axis when the MEMS LiDAR is started;

acquiring echo data from scanning a window at the adjusted angles of the galvanometer in the X axis and the Y axis;

acquiring distances, from the echo data, between an upper edge, a lower edge, a left edge, and a right edge of the window and the MEMS LiDAR; and determining whether a field of view of the galvanometer is abnormal or not based on the distances between the upper edge, the lower edge, the left edge, and the right edge of the window and the MEMS LiDAR.

In an embodiment, when the processor 1001 determines whether the field of view of the galvanometer is abnormal or not based on the distances between the upper edge, the lower edge, the left edge, and the right edge of the window and the MEMS LiDAR, the specific operations are performed as follows:

respectively comparing the distances between the upper edge, the lower edge, the left edge, and the right edge of the window and the MEMS LiDAR with a preset distance range;

determining that the field of view of the galvanometer is normal if the distances between the upper edge, the lower edge, the left edge, and the right edge of the window and the MEMS LiDAR are all within the preset distance range; and determining that the field of view of the galvanometer is abnormal if at least one of the distances between the upper edge, the lower edge, the left edge, and the right edge of the window and the MEMS LiDAR is not within the preset distance range.

In an embodiment, when the processor 1001 determines that the field of view of the galvanometer is normal if the distances between the upper edge, the lower edge, the left edge, and the right edge of the window and the MEMS LiDAR are all within the preset distance range, the specific operations are performed as follows:

determining that the X-axis scanning of the galvanometer is normal if the distance between the upper edge of the window and the MEMS LiDAR is within the preset distance range and the distance between the lower edge of the window and the MEMS LiDAR is within the preset distance range; and determining that the Y-axis scanning of the galvanometer is normal if the distance between the left edge of the window and the MEMS LiDAR is within the preset distance range and the distance between the right edge of the window and the MEMS LiDAR is within the preset distance range.

In an embodiment, after the processor 1001 determines whether the field of view of the galvanometer is abnormal or not based on the distances between the upper edge, the lower edge, the left edge, and the right edge of the window and the MEMS LiDAR, the additional operations are also performed as follows:

adjusting the angles of the galvanometer in the X-axis direction and the Y-axis direction to previous angles before the LiDAR is started if the field of view of the galvanometer is determined to be normal, and driving the galvanometer to scan at the previous angles; and outputting a fault code to a master computer if the field of view of the galvanometer is determined to be abnormal.

In some embodiments, the processor 1001 also performs the following operations:

acquiring a feedback signal from a feedback circuit of the galvanometer at a current moment when the MEMS LiDAR is operating;

acquiring amplitudes of the feedback signal in the directions of an X axis and a Y axis, the amplitudes of the feedback signal in the directions of the X axis and the Y axis being angles of the galvanometer at the current moment in the X axis and the Y axis; and determining whether a field of view of the galvanometer at the current moment is abnormal or not based on the amplitudes of the feedback signal in the directions of the X axis and the Y axis.

In an embodiment, when the processor 1001 determines whether the field of view of the galvanometer at the current moment is abnormal or not based on the amplitudes of the feedback signal in the direction of the X axis and the Y axis, the specific operations are performed as follows:

respectively comparing the amplitudes of the feedback signal in the directions of the X axis and the Y axis with reference amplitude ranges respectively corresponding thereto;

determining that the field of view of the galvanometer at the current moment is normal if the amplitudes of the X axis and the Y axis are both within the reference amplitude ranges respectively corresponding thereto; and determining that the field of view of the galvanometer at the current moment is abnormal if at least one of the amplitudes of the X axis and the Y axis is not within the reference amplitude range corresponding thereto.

In an embodiment, when the processor 1001 determines that the field of view of the galvanometer at the current moment is normal if the amplitudes of the galvanometer in the X axis and the Y axis are both within the reference amplitude ranges respectively corresponding thereto, the specific operations are performed as follows:

determining that X-axis scanning of the galvanometer at the current moment is normal if the amplitude of the galvanometer in the X axis is within the reference amplitude range corresponding thereto; and determining that Y-axis scanning of the galvanometer at the current moment is normal if the amplitude of the galvanometer in the Y axis is within the reference amplitude range corresponding thereto.

In an embodiment, after the processor 1001 determines whether the field of view of the galvanometer at the current moment is abnormal or not based on the amplitudes of the feedback signal in the directions of the X axis and the Y axis, the additional operations are also performed as follows:

driving the galvanometer to continue operation if the field of view of the galvanometer at the current moment is determined to be normal; and outputting a fault code to a master computer if the field of view of the galvanometer at the current moment is determined to be abnormal.

According to the technical solutions provided in the embodiments of the present application, the field of view of the galvanometer can be detected when the MEMS LiDAR is started, and the starting of the MEMS LiDAR is interrupted when the field of view of the galvanometer is detected to be abnormal, and meanwhile, the fault code is output to the master computer, so that the safety problem caused by the abnormal field of view of the galvanometer is avoided, and the reliability and safety of the MEMS LiDAR are improved. In addition, during the operation of the MEMS LiDAR, whether the field of view of the galvanometer at the current moment is abnormal or not can be determined based on the amplitudes of the galvanometer at the current moment in the X axis and the Y axis, wherein if the field of view of the galvanometer at the current moment is normal, the MEMS LiDAR is kept to operate normally, and if the field of view of the galvanometer at the current moment is abnormal, the fault code is output to the master computer to prompt a user to deal with this case accordingly, so that whether the field of view of the galvanometer is abnormal or not during the operation of the MEMS LiDAR can be determined in real time, thereby avoiding the safety problem caused by the abnormal field of view of the galvanometer, and improving the safety and reliability of the MEMS LiDAR.

It will be understood by those of ordinary skill in the art that all or a part of the procedures of the methods in the embodiments described above may be implemented by a computer program instructing relevant hardware. The program may be stored in a computer-readable storage medium; and the program, when executed, may include the procedures in the embodiments of the methods described above. The storage medium may be a magnetic disk, an optical disk, a ROM, a RAM, or the like.

The above disclosure is only for the purpose of illustrating the preferred embodiments of the present application and should not be taken as limiting the scope of the claims of the present application, so that equivalent changes made to the claims of the present application still fall within the scope of the present application.

What is claimed is:

1. An abnormal field of view recognition method applied to a MEMS LiDAR comprising a galvanometer, comprising:

in response to the MEMS LiDAR being started, respectively adjusting angles of the galvanometer in an X axis and a Y axis, wherein the galvanometer is unable to scan edges of a window during normal operation, and the angles of the galvanometer in the X axis and the Y axis are increased to scan the edges of the window for detection;

acquiring echo data from scanning a window at the adjusted angles of the galvanometer in the X axis and the Y axis;

acquiring distances, from the echo data, between an upper edge, a lower edge, a left edge, and a right edge of the window and the MEMS LiDAR; and determining whether a field of view of the galvanometer is abnormal or not based on the distances between the upper edge, the lower edge, the left edge, and the right edge of the window and the MEMS LiDAR, wherein the determining whether a field of view of the galvanometer is abnormal or not based on the distances between the upper edge, the lower edge, the left edge, and the right edge of the window and the MEMS LiDAR comprises:

respectively comparing the distances between the upper edge, the lower edge, the left edge, and the right edge of the window and the MEMS LiDAR with a preset distance range; and wherein after the determining whether a field of view of the galvanometer is abnormal or not based on the distances between the upper edge, the lower edge, the left edge, and the right edge of the window and the MEMS LiDAR, the method further comprises:

adjusting the angles of the galvanometer in the X axis and the Y axis to previous angles before the MEMS LiDAR is started if the field of view of the galvanometer is determined to be normal, and driving the galvanometer to scan at the previous angles; and outputting a fault code to a master computer if the field of view of the galvanometer is determined to be abnormal.

2. The method according to claim 1, wherein the determining whether a field of view of the galvanometer is abnormal or not based on the distances between the upper edge, the lower edge, the left edge, and the right edge of the window and the MEMS LiDAR comprises:

determining that the field of view of the galvanometer is normal if the distances between the upper edge, the lower edge, the left edge, and the right edge of the window and the MEMS LiDAR are all within the preset distance range; and determining that the field of view of the galvanometer is abnormal if at least one of the distances between the upper edge, the lower edge, the left edge, and the right edge of the window and the MEMS LiDAR is not within the preset distance range.

3. The method according to claim 2, wherein the determining that the field of view of the galvanometer is normal comprises:

determining that a Y-axis scanning of the galvanometer is normal if the distance between the upper edge of the window and the MEMS LiDAR is within the preset distance range and the distance between the lower edge of the window and the MEMS LiDAR is within the preset distance range; and determining that an X-axis scanning of the galvanometer is normal if the distance between the left edge of the window and the MEMS LiDAR is within the preset distance range and the distance between the right edge of the window and the MEMS LiDAR is within the preset distance range.

4. An abnormal field of view recognition device applied to a MEMS LiDAR comprising a galvanometer, comprising:

an angle adjustment module, configured to respectively adjust angles of the galvanometer in an X axis and a Y axis in response to the MEMS LiDAR being started, wherein the galvanometer is unable to scan edges of a window during normal operation, and the angles of the galvanometer in the X axis and the Y axis are increased to scan the edges of the window for detection;

a data acquisition module, configured to acquire echo data from scanning a window at the adjusted angles of the galvanometer in the X axis and the Y axis;

a distance acquisition module, configured to acquire distances, from the echo data, between an upper edge, a lower edge, a left edge, and a right edge of the window and the MEMS LiDAR; and a field of view determination module, configured to determine whether a field of view of the galvanometer is abnormal or not based on the distances between the upper edge, the lower edge, the left edge, and the right edge of the window and the MEMS LiDAR, wherein the field of view determination module comprises:

a distance comparison unit, configured to respectively compare the distances between the upper edge, the lower edge, the left edge, and the right edge of the window and the MEMS LiDAR with a preset distance range; and the device also comprising:

an angle recovery module, configured to adjust the angles of the galvanometer in the X axis and the Y axis direction to previous angles before the MEMS LiDAR starting if the field of view of the galvanometer is determined to be normal, and driving the galvanometer to scan at the previous angles; and a fault notification module, configured to output a fault code to a master computer if the field of view of the galvanometer is determined to be abnormal.

5. The device according to claim 4, wherein the field of view determination module comprises:

a field of view determination unit, configured to determine that the field of view of the galvanometer is normal if the distances between the upper edge, the lower edge, the left edge, and the right edge of the window and the MEMS LiDAR are all within the preset distance range, wherein the field of view determination unit is further configured to determine that the field of view of the galvanometer is abnormal if at least one of the distances between the upper edge, the lower edge, the left edge, and the right edge of the window and the MEMS LiDAR is not within the preset distance range.

6. The device according to claim 5, wherein the field of view determination unit comprises:

a Y-axis determination subunit, configured to determine that a Y-axis scanning of the galvanometer is normal if the distance between the upper edge of the window and the MEMS LiDAR is within the preset distance range and the distance between the lower edge of the window and the MEMS LiDAR is within the preset distance range; and an X-axis determination subunit, configured to determine that an X-axis scanning of the galvanometer is normal if the distance between the left edge of the window and the MEMS LiDAR is within the preset distance range and the distance between the right edge of the window and the MEMS LiDAR is within the preset distance range.

* * * * *